(12) United States Patent
Higashino

(10) Patent No.: US 8,027,423 B2
(45) Date of Patent: Sep. 27, 2011

(54) SYNCHRONIZING APPARATUS, SYNCHRONIZING METHOD, SYNCHRONIZING PROGRAM AND DATA REPRODUCTION APPARATUS

(75) Inventor: Satoru Higashino, Tokyo (JP)

(73) Assignee: Sony Corporation, Tokyo (JP)

( * ) Notice: Subject to any disclaimer, the term of this patent is extended or adjusted under 35 U.S.C. 154(b) by 1076 days.

(21) Appl. No.: 11/581,238

(22) Filed: Oct. 16, 2006

(65) Prior Publication Data

US 2007/0092040 A1    Apr. 26, 2007

(30) Foreign Application Priority Data

Oct. 25, 2005  (JP) ................................. 2005-310077

(51) Int. Cl.
*H03D 3/24* (2006.01)
(52) U.S. Cl. ........ 375/376; 375/327; 375/369; 375/229; 375/344; 360/51; 360/65; 360/31; 360/39; 327/113; 327/156; 327/159; 331/11; 331/14; 331/18
(58) Field of Classification Search .................. 375/376, 375/229, 369, 327, 344; 369/47; 327/113, 327/156, 159; 331/11, 14, 18; 360/51, 65, 360/31, 39
See application file for complete search history.

(56) References Cited

U.S. PATENT DOCUMENTS

| | | | | |
|---|---|---|---|---|
| 5,579,346 A | * | 11/1996 | Kanzaki | .................... 375/344 |
| 5,841,323 A | * | 11/1998 | Fujimoto | .................... 331/11 |
| 6,141,163 A | * | 10/2000 | Nakamura et al. | .............. 360/51 |
| 2003/0128451 A1 | * | 7/2003 | Ohta et al. | ...................... 360/51 |

FOREIGN PATENT DOCUMENTS

| | | |
|---|---|---|
| JP | 09-214893 A | 8/1997 |
| JP | 10-027435 A | 1/1998 |
| JP | 2000-285605 A | 10/2000 |
| JP | 2002-208855 A | 7/2002 |
| JP | 2003-037498 A | 2/2003 |
| JP | 2003-078409 A | 3/2003 |
| JP | 2003-281831 A | 10/2003 |
| JP | 2005-108295 | 4/2005 |

OTHER PUBLICATIONS

Floyd M. Gardner, "Interpolation in Digital Modems-Part 1: Fundamentals" IEEE Transactions, vol. 41, No. 3, Mar. 1993.
Lars Erup, "Interpolation in Digital Modems-Part 2: Implementation and Performance" IEEE Transactions, vol. 41, No. 6, Jun. 1993.

* cited by examiner

*Primary Examiner* — Eva Y Puente
(74) *Attorney, Agent, or Firm* — Wolf, Greenfield & Sacks, P.C.

(57) ABSTRACT

A synchronizing apparatus, which controls, by a PLL circuit, a sampling clock to be used to sample input data and synchronizes a phase of the sampling clock with a target phase that is desirable for sampling the input data, includes: phase error detection means for detecting a phase error from sampling data and the sampling clock, the sampling data being sampled from the input data at timing of the sampling clock; frequency error detection means for detecting, based on a differential coefficient obtained as a result of detecting the phase error, a frequency error; and frequency correction means for correcting a frequency of the sampling clock such that the detected frequency error becomes close to zero by adding a frequency correction value to an integral term of a loop filter of the PLL circuit, the frequency correction value being calculated based on the frequency error.

8 Claims, 12 Drawing Sheets

SYNCHRONIZING APPARATUS, SYNCHRONIZING METHOD, SYNCHRONIZING PROGRAM AND DATA REPRODUCTION APPARATUS

CROSS REFERENCE TO RELATED APPLICATION

The present invention contains subject matter related to Japanese Patent Application JP2005-310077 filed in the Japanese Patent Office on Oct. 25, 2005, the entire contents of which being incorporated herein by reference.

BACKGROUND OF THE INVENTION

1. Field of the Invention

The present invention relates to a synchronizing apparatus synchronizing method, synchronizing program and data reproduction apparatus, and is preferably applied to an optical disc device, for example.

2. Description of Related Art

Typically, an optical disc device records data on an optical disc and reads out the data from the optical disc to reproduce in accordance with standards such as "Blu-ray Disc (Registered Trademark)" and Digital Versatile Disc (DVD). This kind of optical disc device is here to stay.

To read data from the optical disc, the optical disc device for example emits a laser beam to the optical disc, generates reproduced Radio Frequency (RF) signal based on the reflection, samples the reproduced RF signal, converts it into discrete code values based on the sampled values, and then finally reproduces desired data.

To sample the reproduced RF signal, the optical disc device controls a Phase Locked Loop (PLL) circuit to adjust the timing of sampling (i.e. phases) to a target timing (also referred to as a "target phase") that is desirable to sample the signal. This allows the optical disc device to reproduce precisely desired data.

An optical disc device that selects a first or second phase synchronization section for a PLL circuit to lock on, or synchronize phases at high speed is disclosed. (see Jpn. Pat. Laid-open Publication No. H08-107352 [FIG. 1], for example).

SUMMARY OF THE INVENTION

In recent years, even though the optical disc device can record and read data from the optical disc at high speed, the speed of the PLL circuit is limited. Therefore, the PLL circuit may include a pipeline delay.

In this case, in the optical disc device, the pipeline delay causes delay in a loop of the PLL circuit (i.e. loop delay). The long time delay may cause not only phase errors but also frequency errors.

In the optical disc device, it is possible to speed up the PLL circuit's phase synchronization, but it may be impossible to widen the frequency range which the PLL circuit will accept and lock on, or a capture range.

Accordingly, it takes time for the optical disc device to lock on because the frequency error is too large. In addition, the relatively long loop delay may lead to breakdown.

The present invention has been made in view of the above points and is intended to provide a synchronizing apparatus synchronizing method and synchronizing program capable of improving phase-locking capability with a wide capture range for frequency error, and a data reproduction apparatus capable of reproducing data precisely by improving phase-locking capability with a wide capture range for frequency error.

In an embodiment of the present invention, a synchronizing apparatus, synchronizing method and synchronizing program, which controls, by a Phase Locked Loop (PLL) circuit, a sampling clock to be used to sample input data and synchronizes a phase of the sampling clock with a target phase that is desirable for sampling the input data, performs the process of: detecting a phase error from sampling data and the sampling clock, the sampling data being sampled from the input data at timing of the sampling clock; detecting, based on a differential coefficient obtained as a result of detecting the phase error, a frequency error; and correcting a frequency of the sampling clock such that the detected frequency error becomes close to zero by adding a frequency correction value to an integral term of a loop filter of the PLL circuit, the frequency correction value being calculated based on the frequency error.

That allows detecting the frequency error precisely. In addition, adjusting the loop filter of the PLL circuit based on the frequency error directly corrects the frequency error.

In addition, in an embodiment of the present invention, a data reproduction apparatus, which controls, by a PLL circuit, a sampling clock to be used to sample read data read out from a storage medium and synchronizes a phase of the sampling clock with a target phase that is desirable for sampling the read data to reproduce data, includes: read data generation means for generating the read data by accessing the storage medium; phase error detection means for detecting a phase error from sampling data and the sampling clock, the sampling data being sampled from the read data at timing of the sampling clock; frequency error detection means for detecting, based on a differential coefficient obtained as a result of detecting the phase error, a frequency error; frequency correction means for correcting a frequency of the sampling clock such that the detected frequency error becomes close to zero by adding a frequency correction value to an integral term of a loop filter of the PLL circuit, the frequency correction value being calculated based on the frequency error; and reproduction means for reproducing the data by performing a predetermined signal process on the sampling data.

That allows detecting the frequency error precisely. In addition, adjusting the loop filter of the PLL circuit based on the frequency error directly corrects the frequency error. In effect, that increases the accuracy of reproducing data.

In this manner, the synchronizing apparatus, the synchronizing method and the synchronizing program can detect the frequency error precisely. In addition, adjusting the loop filter of the PLL circuit based on the frequency error directly corrects the frequency error. Thus, the synchronizing apparatus, the synchronizing method and the synchronizing program can improve phase-locking capability with a wide capture range for frequency error.

Furthermore, the data reproduction apparatus can detect the frequency error precisely. In addition, adjusting the loop filter of the PLL circuit based on the frequency error directly corrects the frequency error. That increases the accuracy of reproducing data. Thus, the data reproduction apparatus can reproduce data precisely by improving phase-locking capability with a wide capture range for frequency error.

The nature, principle and utility of the invention will become more apparent from the following detailed description when read in conjunction with the accompanying drawings in which like parts are designate by like reference numerals or characters.

DETAILED DESCRIPTION OF PREFERRED EMBODIMENTS

Figure 1:
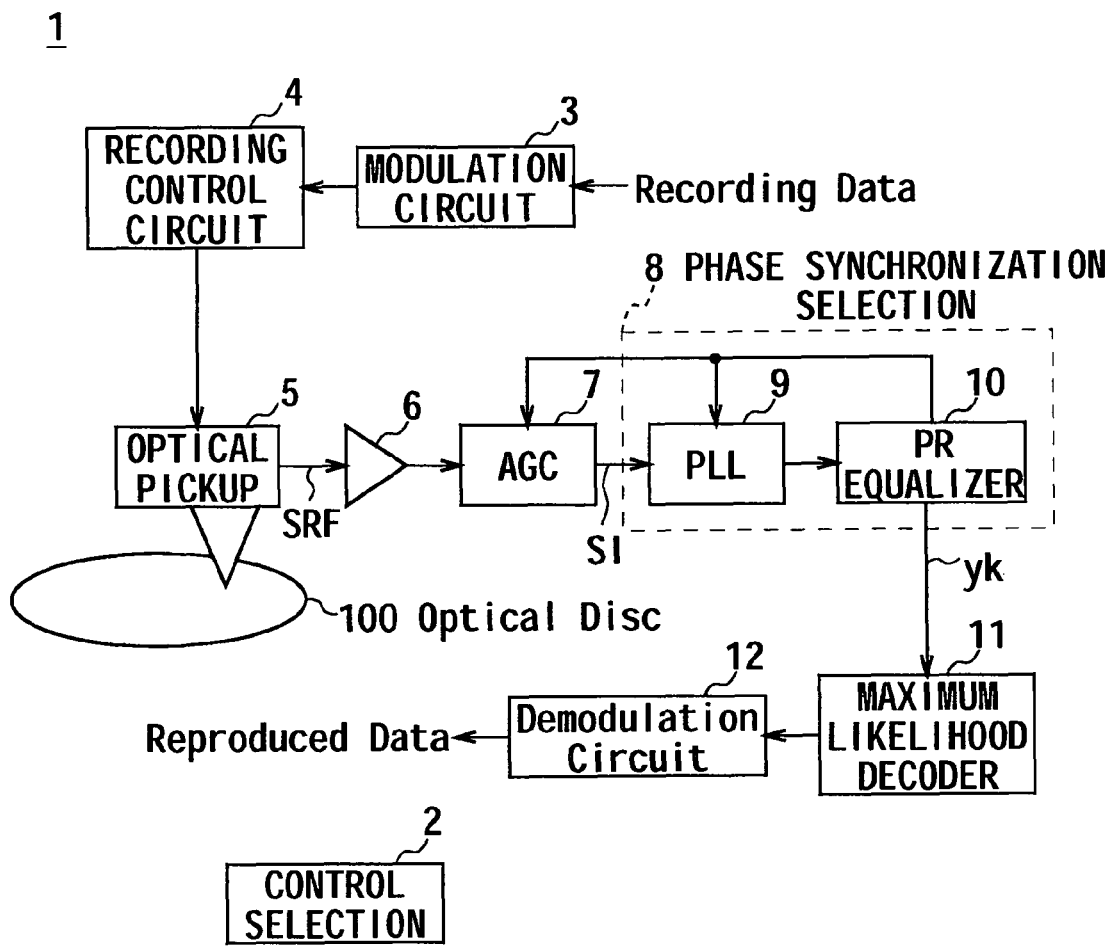
FIG. 1 is a block diagram showing the configuration of an optical disc device according to an embodiment of the present invention.

An embodiment of the present invention will be described in detail with reference to the accompanying drawings.
(1) Configuration of Optical Disc Device
(1-1) Overall Configuration of Optical Disc Device FIG. 1 shows an optical disc device 1 having a control section 2 that takes overall control of the optical disc device 1. In general, the optical disc device 1 records, in accordance with recording data, data strings on an optical disc 100 with the format of "Blu-ray Disc (Registered Trademark)". The optical disc device 1 also reads out the data strings from the optical disc 100 to generate reproduced data.

The control section 2 includes a Central Processing Unit (CPU) (not shown), which is a major component; a Read Only Memory (ROM) (not shown); and a Random Access Memory (RAM) (not shown). The control section 2 reads out various programs, such as a control program, from the ROM and loads them onto the RAM to perform process such as recording and reproducing data from the optical disc 100.

To record data on the optical disc 100, the optical disc device 1 receives recording data from outside, and then performs a predetermined modulation process on the recording data by a modulation circuit 3 to create modulated data DM. The optical disc device 1 supplies the modulated data DM to a recording control circuit 4.

The recording control circuit 4 controls an optical pickup 5 to emit, based on the modulated data DM, a laser beam to a signal recording surface of the optical disc 100 from the optical pickup 5. This creates a row of pits, whose pattern corresponds to the recording data, on the optical disc 100.

To reproduce data from the optical disc 100, the optical disc device 1 under the control of the control section 2 emits a laser beam to the optical disc 100 from the optical pickup 5. The optical disc device 1 then performs photoelectric conversion process on the reflection to generate a reproduced RF signal SRF, and amplifies the reproduced RF signal SRF through an amplifier 6, and adjusts its signal level by an Auto Gain Control (AGC) circuit 7, and then supplies the reproduced RF signal SRF to a phase synchronization circuit 8. By the way the reproduced RF signal SRF to be supplied to the phase synchronization circuit 8 will also be referred to as an input signal SI.

The phase synchronization circuit 8 includes an Interpolated Timing Recovery (ITR) circuit to perform timing adjustment or interpolation process on the input signal SI and a sampling clock. A Phase Locked Loop (PLL) circuit 9 adjusts the phase of the sampling clock to match a target phase that is desirable to sample the input signal SI. A Partial Response (PR) equalizer 10 then shapes a waveform of the signal.

In addition, the phase synchronization circuit 8 supplies to the AGC circuit 7 a signal for controlling feedback of gain. The phase synchronization circuit 8 also supplies a waveform equalized signal yk to a maximum likelihood decoder 11 (the k represents a clock).

The maximum likelihood decoder 11 performs, based on the waveform equalized signal yk supplied from the phase synchronization section 8, Maximum Likelihood (ML) Decoding Process. This generates decoded data which is then supplied to a demodulation circuit 12.

The demodulation circuit 12 performs a predetermined demodulation process and other process on the decoded data supplied from the maximum likelihood decoder 11 to generate the reproduced data.

In this manner, based on the reproduced RF signal SRF from the optical disc 100, the optical disc device 1 performs phase-synchronizing process by the PLL circuit 9 of the phase synchronization circuit 8, and waveform-shaping process by the PR equalizer 10. In addition to that, the optical disc device 1 performs maximum likelihood decoding process and demodulation process to generate the reproduced data.

(1-2) Basic Circuit Configuration of Phase Synchronization Section

Figure 2:
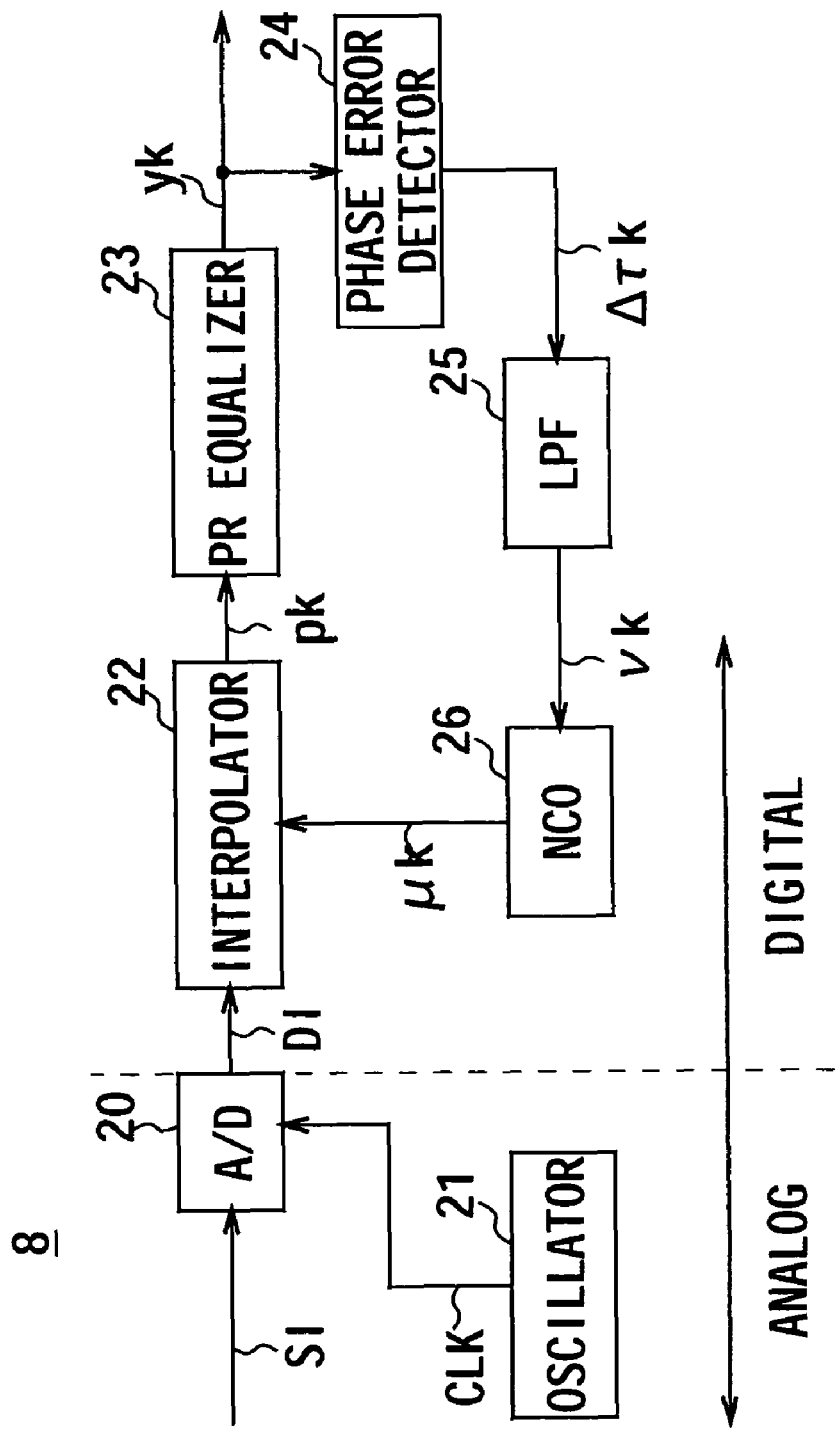
FIG. 2 is a block diagram showing the basic circuit configuration of a phase synchronization section.

FIG. 2 shows the basic circuit configuration of the phase synchronization section 8. In general, the phase synchronization section 8 includes an ITR circuit having a digital PLL. The phase synchronization section 8 performs process such as timing-adjusting on the input signal SI in order for the subsequent demodulation circuit 12 (FIG. 1) to generate the reproduced data by the desirable sampling timing.

By the way, the basic configuration of the ITR circuit is disclosed in Non-Patent Document 1 (Floyd M. Gardner, "Interpolation in Digital Modems-Part 1: Fundamentals" IEEE TRANSACTIONS, VOL. 41, No. 3, MARCH 1993) and in Non-Patent Document 2 (Lars Erup, "Interpolation In Digital Modems-Part 2: Implementation and Performance" IEEE TRANSACTIONS, VOL. 41, No. 6, JUNE 1993). In addition, an optical disc device having an ITR is disclosed in Patent Document 2 (see Jpn. Pat. Laid-open Publication No. 2005-108295, for example) whose applicant is the same as the applicant of the present invention.

An Analog to Digital (A/D) converter 20 of the phase synchronization section 8 performs analog to digital conversion on the analog input signal SI to produce a digital input signal DI: the A/D converter 20 samples the analog input signal SI in accordance with a clock signal CLK supplied from an oscillator 21 at predetermined interval of time. The A/D converter 20 then supplies the digital input signal DI to an interpolator 22.

The basic operation of the interpolator 22 is this: the interpolator 22 performs interpolation, based on a sampling phase μk (described later) supplied from a Number Controlled Oscillator (NCO) circuit 26, on the digital input signal DI to generate an interpolated signal pk. The interpolator 22 then supplies the interpolated signal pk to a PR equalizer 23 which is equivalent to the PR equalizer 10 (FIG. 1).

The PR equalizer 23 performs PR equalizing process on the interpolated signal pk to shape its waveform based on the premise of intersymbol interference such that the values of the interpolated signal pk on the sampling clocks at this time become a ratio of rational numbers. That produces a waveform equalized signal yk. The PR equalizer 23 then supplies the waveform equalized signal yk to a phase error detector 24.

The phase error detector 24 detects, based on the waveform equalized signal yk, a phase error signal Δτk indicative of the phase lag between a predetermined target phase and the current phase, and then supplies the phase error signal Δτk to a Low Pass Filter (LPF) circuit 25.

The LPF circuit 25 includes a secondary control loop, which is known in the field of control engineering, to calculate a difference of timings to be used to update sampling phases. The LPF circuit 25 extracts the low frequency range of the phase error signal Δτk to calculate the difference of timings νk, and then supplies the difference of timings νk to a NCO circuit 26.

The NCO circuit 26 is equivalent to a Voltage Controlled Oscillator (VCO) embedded in an analog PLL circuit. The NCO circuit 26 generates, based on the difference of timings νk, the sampling phase μk, and then supplies the sampling phase μk to the interpolator 22. Based on the newly-supplied sampling phase μk, the interpolator 22 changes the phase of the sampling clock for the input signal SI.

In this manner, the phase synchronization section 8 is designed to be a digital PLL circuit (also referred to as a phase convergence loop), including the interpolator 22, the PR equalizer 23, the phase error detector 24, the LPF circuit 25 and the NCO circuit 26. The phase synchronization section 8 repeatedly performs a series of loop processes such as detecting the phase lag between the target phase and the current phase and changing the phase of the sampling clock to eliminate the phase lag. Therefore, the current phase gets close to the target phase, and then the phase lag can be gradually eliminated.

(1-3) Detailed Circuit Configuration of Phase Synchronization Section

Figure 3:
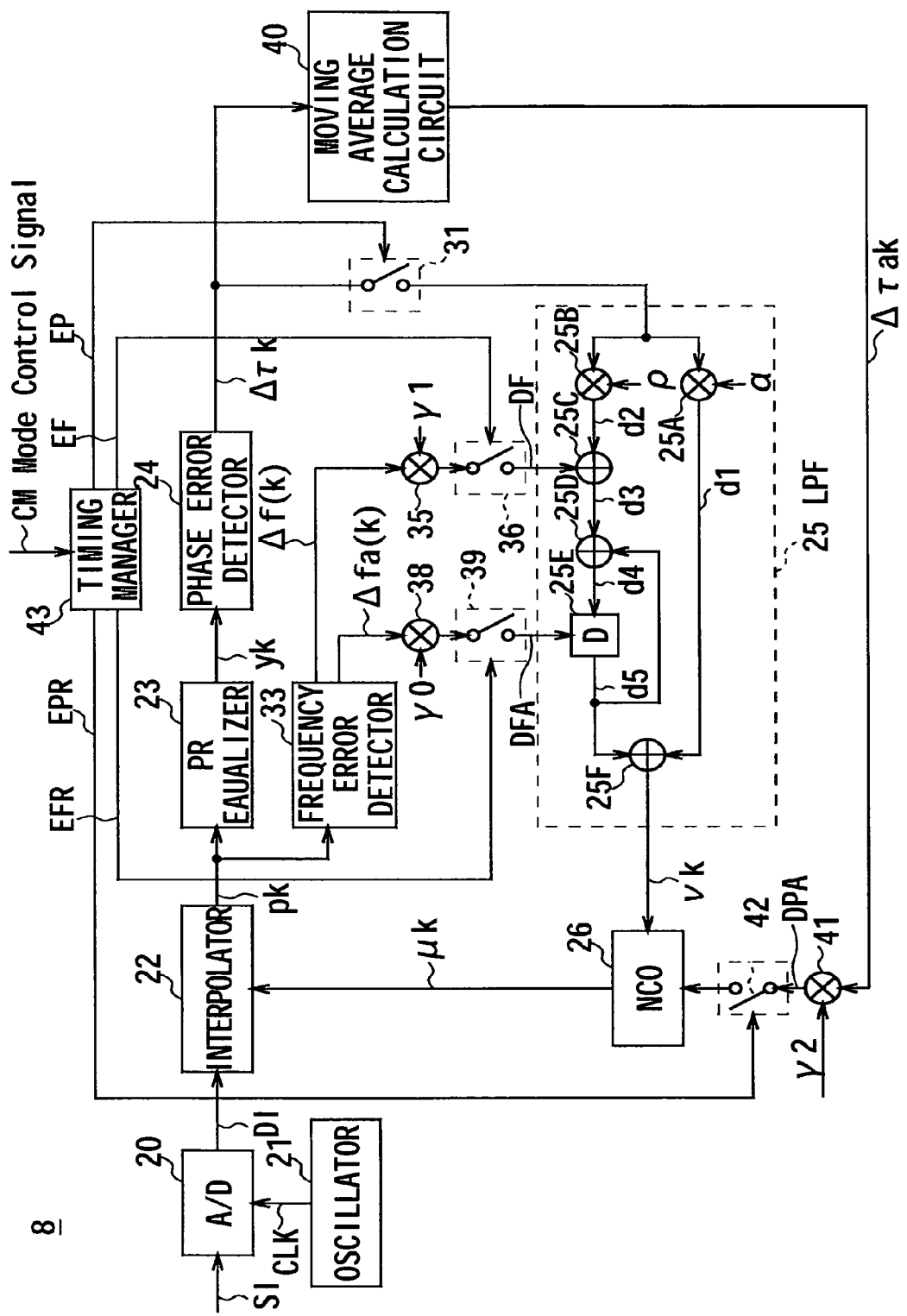
FIG. 3 is a block diagram showing the detailed circuit configuration of the phase synchronization section.

FIG. 3 (whose parts have been designated by the same reference symbols and marks as the corresponding parts of FIG. 2) shows the detailed configuration of the phase synchronization section 8.

Relative to the basic circuit configuration shown in FIG. 2, the phase synchronization section 8 shown in FIG. 3 includes a switch 31 between the phase error detector 24 and the LPF circuit 25; a frequency error detection circuit 33; and a timing manager 43 (described later).

(1-3-1) Configuration of Interpolator

Figure 4:
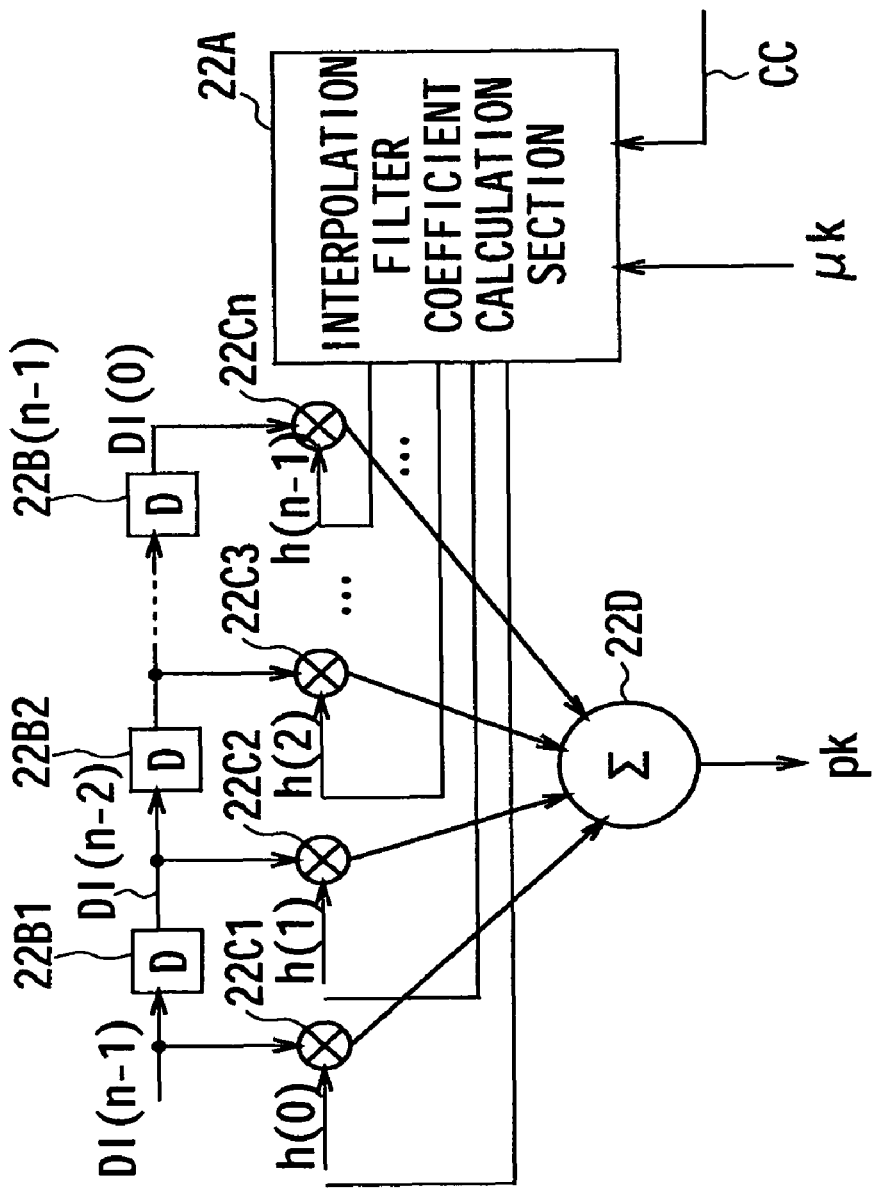
FIG. 4 is a block diagram showing the circuit configuration of an interpolator.

FIG. 4 shows the circuit configuration of the interpolator 22. The interpolator 22 includes n stages of Finite Impulse Response (FIR) filters (n: Integer).

The interpolator 22 sequentially shifts the digital input signal DI by n−1 stages of shift registers 22B1 to 22B(n−1). In this manner, the interpolator 22 holds, or latches, the digital input signals SI that range from the digital input signal DI(n−1), which was obtained one clock before, to the digital input signal DI(1), which was obtained (n−1) clock before.

In addition, the interpolator 22 supplies the following signals to multipliers 22C1 to 22Cn: the digital input signal DI (which is the digital input signal DI(n−1) in this case for ease of explanation) supplied from the A/D converter 20; and the digital input signals DI (n−2) to DI(0) which have been delayed by the shift registers 22B1 to 22B(n−1).

Furthermore, the interpolator 22 performs a predetermined computation process with the sampling phase μk by an interpolation filter coefficient calculation section 22A to obtain n filter coefficients h(0) to h(n−1) (described later), and then supplies the filter coefficients h(0) to h(n−1) to the multipliers 22C1 to 22Cn.

The interpolator 22 multiplies the digital input signals DI(n−1) to DI(0) by the filter coefficients h(0) to h(n−1) by the multipliers 22C1 to 22Cn, and adds those together by an accumulator 22D to generate the interpolated signal pk (k: Clock).

In this manner, the interpolator 22 delays the digital input signal DI by the FIR filters, and also applies the filter coefficients h(0) to h(n−1), which was calculated based on the sampling phase μk, to the FIR filters to generate the interpolated signal pk.

By the way, in the optical disc device 1 (FIG. 1), there is a possibility that the high frequency range of the reproduced RF signal SRF has been deteriorated due to frequency characteristics of the amplifier 6 and optical characteristics of paths of the laser beam reflected by the optical disc 100 and the like. Therefore, in the phase synchronization section 8, the high frequency range of the digital input signal D1, which is to be supplied to the interpolator 22, may be also deteriorated. This lowers the capability of the subsequent stages of the phase error detector 24 and the like to detect the phases.

Therefore, the interpolation filter coefficient calculation section 22A of the interpolator 22 acquires a predetermined coefficient control signal CC from the control section 2 (FIG. 1) in order to calculate the filter coefficients h(0) to h(n−1) to emphasize the high frequency range.

In general, in the field of optical recording such as "Blu-ray Disc (Registered Trademark)", a frequency of 2T with the highest frequency or the shortest wavelength is equivalent to one-fourth of a channel frequency. Therefore, to emphasize one-fourth channel frequency, a function in frequency space is defined as follows:

$$0 \leq i \leq \frac{n}{2}: \qquad G(i) = 1 + B\left\{1 - \cos\left(\frac{2 \times i}{n \times 2 \times \pi}\right)\right\} \quad (1)$$

$$M \times n - \frac{n}{2} \leq i \leq M \times n - 1: \quad G(i) = 1 + B\left\{1 - \cos\left(\frac{2(M \times n - i)}{n \times 2 \times \pi}\right)\right\}$$

$$\text{else:} \qquad G(i) = 0$$

where the number of taps on the interpolator 22 is n, and resolution time is M. Because they will be discrete frequency due to digital processing, the frequency is expressed in i (i: Integer).

Figure 5:
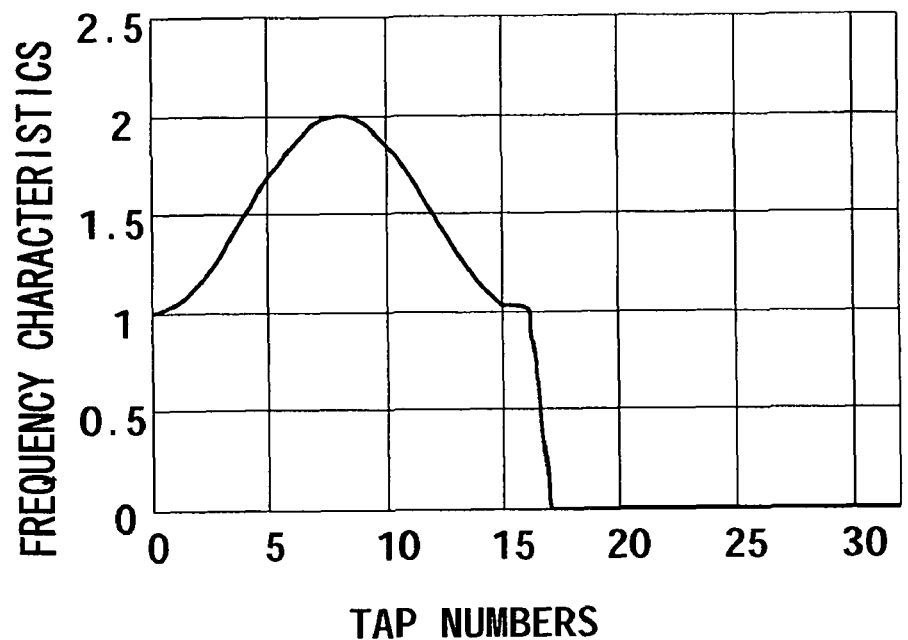
FIG. 5 is a schematic diagram showing the frequency characteristics of an interpolation filter.

FIG. 5 shows a part of waveform simulated from a model where the resolution time M is 64 and the number of taps n is 32 on the function G(i). The waveform shown in FIG. 5 is equivalent to one obtained when the channel frequency i is 32. The waveform becomes the maximum value when n is 8, one-fourth of 32 of the tap numbers. This means that this function G(i) has characteristics to emphasize the one-fourth channel frequency.

Figure 6:
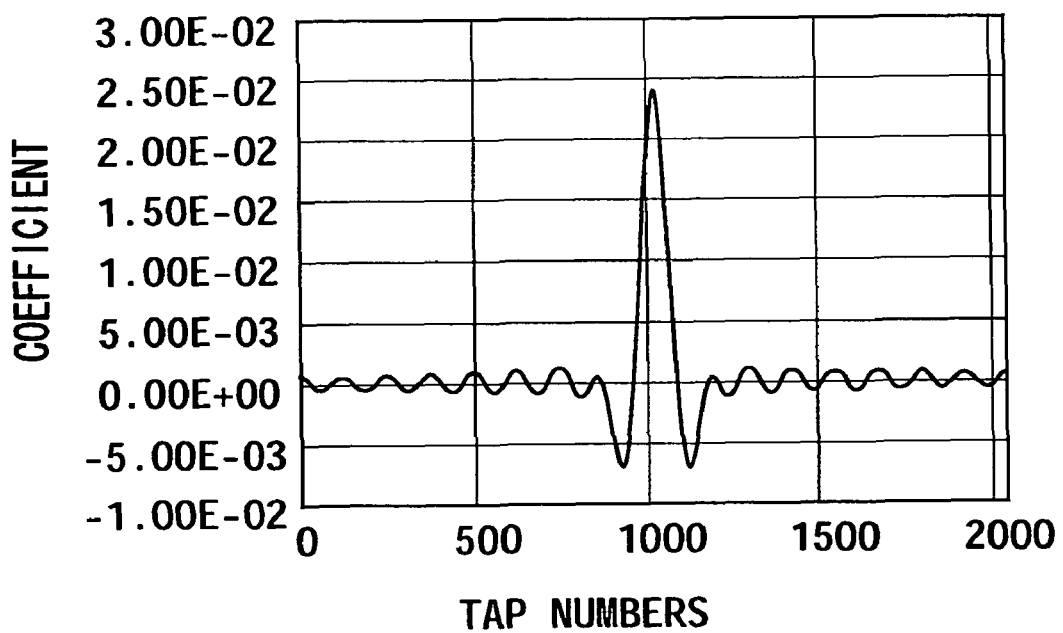
FIG. 6 is a schematic diagram illustrating tap coefficients of the interpolator.

FIG. 6 shows the waveform of a function g(i) that is obtained by performing the reverse Fast Fourier Transform (FFT) process on the function G(i). In this case, where the resolution time M is 64 and the number of taps n is 32, 2048 (64×32) results of computation are obtained. These results are to be used as the filter coefficients h for the interpolator 22.

The control section 2 (FIG. 1) actually stores the function g(i) in a predetermined storage section (storage means). The control section 2 supplies the coefficient control signal CC indicative of the function g(i) to the interpolated filter coefficient calculation section 22A of the interpolator 22 (FIG. 4).

In accordance with the coefficient control signal CC from the control section 2, the interpolated filter coefficient calculation section 22A of the interpolator 22 calculates, using the sampling phase μk supplied from the NCO circuit 26, the function g(i) and the filter coefficients h(0) to h(n−1) in the following manner:

$$h(j)=g(j \times M+\mu k) \qquad (2)$$

where j, representing tap numbers, is an integer value satisfying the following:

$$0 \leq j \leq n-1$$

The interpolator 22 then utilizes the filter coefficients h(0) to h(n−1) as coefficients for the FIR filters (i.e. tap coefficients). Accordingly, the interpolator 22 performs interpolation on the digital input signal DI and also produces the interpolated signal pk whose high frequency range has bee emphasized.

In this manner, the interpolator 22 sets its target frequency characteristics, and performs the reverse FFT process on the frequency characteristics to convert those from frequency axis into time axis, and calculates, based on the result of converting, the filter coefficients for the FIR filters, and then applies those coefficients to the FIR filters.

(1-3-2) Configuration of LPF

The configuration of the LPF circuit 25 (FIG. 3) will be described. The LPF circuit 25 supplies the phase error Δτk, which is supplied from the phase error detector 24, to multipliers 25A and 25B.

The multiplier 25A generates a multiplied value d1 by multiplying the phase error Δτk by a predetermined coefficient α, and then supplies the multiplied value d1 to an accumulator 25F. The multiplier 25B generates a multiplied value d2 by multiplying the phase error Δτk by a predetermined coefficient ρ, and then supplies the multiplied value d2 to an accumulator 25C.

The accumulator 25C adds a frequency correction value DF (described later) and the multiplied value d2 together to generate an added value d3, and then supplies the added value d3 to an accumulator 25D.

The accumulator 25D adds a delayed value d5 supplied from a shift register 25E, which is an output signal one clock before the current one output from the accumulator 25D, and the added value d3 together to generate an added value d4, and then supplies the added value d4 to a shift register 25E.

The shift register 25E delays the added value d4 for a period of one clock to generate the delayed value d5, and supplies the delayed value d5 to the accumulator 25F.

If an average frequency correction value DFA (described later) is supplied to the shift register 25E, the shift register 25E holds the average frequency correction value DFA, and also supplies the average frequency correction value DFA to the accumulator 25F as the delayed value d5.

The accumulator 25F adds the multiplied value d1 supplied from the multiplier 25A and the delayed value d5 supplied from the shift register 25E together to obtain the difference of timings vk.

The difference of timings vk is one obtained, based on the phase error Δτk, by extracting the low frequency range below a cutoff frequency that is determined by coefficients α and ρ. This shows a variation of the change of the phase of the sampling clock on the interpolator 22.

In this manner, the LPF circuit 25 calculates, based on the phase error Δτk, the difference of timings vk, and then supplies the difference of timings vk to the NCO circuit 26.

(2) Detection and Correction of Frequency Error

The phase synchronization section 8 is a PLL circuit to synchronize phases. It is desirable that the phase synchronization section 8 is designed to have a large capture range (i.e. a large frequency range the PLL circuit will accept and lock on).

Accordingly, the phase synchronization section 8 includes, as shown in FIG. 3, the frequency error detection circuit 33 to detect frequency errors. The frequency error detection circuit 33 receives the interpolated signal pk from the interpolator 22, and then detects, based on the interpolated signal pk, the frequency lag between the frequency of the digital input signal DI and that of the NCO circuit 26.

Assume that, in this case, the "Blu-ray Disc ™" is applied; and the interpolated signal pk supplied from the interpolator 22 has been equalized to be a waveform of partial response like PR (1, x, 1). In this case, x is any real number.

(2-1) Configuration of Frequency Error Detection Circuit

Figure 7:
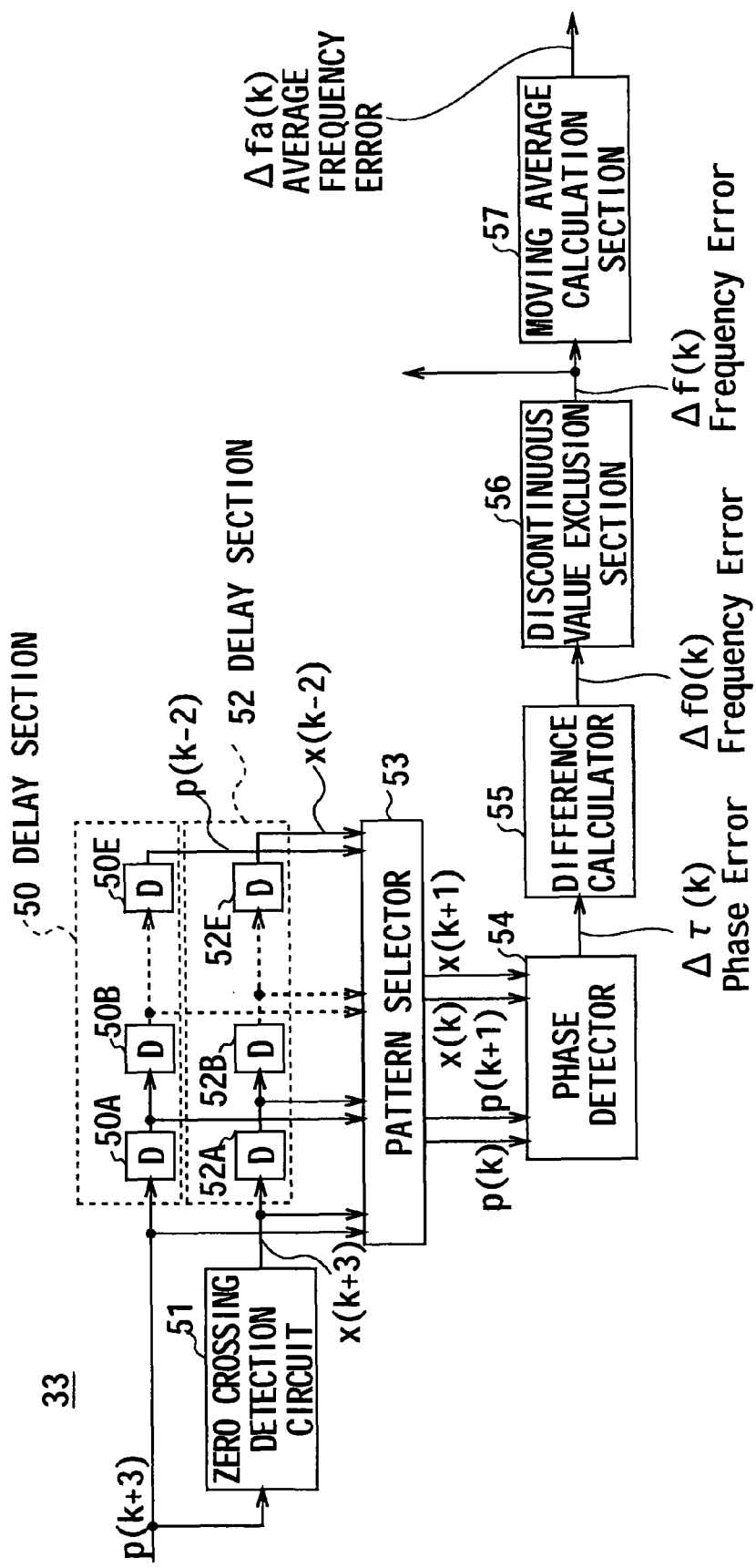
FIG. 7 is a block diagram showing the configuration of a frequency error detection circuit.

As shown in FIG. 7, the frequency error detection circuit 33 supplies the interpolated signal pk, which is output from the interpolator 22, to a shift register 50A of a delay section 50 and a pattern selector 53 of a zero crossing detection circuit 51 (For ease of explanation, the signal pk is actually the interpolated signal p(k+3) at clock (k+3) in this case).

The delay section 50 includes five shift registers 50A to 50E each of which is serially connected to one another. Each registers 50A to 50E delays the interpolated signal p(k+3) for a period of one clock, and that produces the interpolated signals p(k+2) to y(k−2) which are then supplied to the pattern selector 53.

The zero crossing detection circuit 51 compares the interpolated signal p(k+3) with zero to detect whether a code is positive or negative. By the way, at this time when the sampling clock probably still doesn't catch up with the target phase, that detection of codes means tentatively determining codes using the interpolated signal p(k+3).

The zero crossing detection circuit 51 generates a detection result x(k+3) by Non Return Zero (NRZ) where it gives "+1" when the detected code is positive or "−1" when the detected code is negative. The zero crossing detection circuit 51 then supplies the detection result x(k+3) to a shift register 52A of a delay section 52 and the pattern selector 53.

In a similar way to the delay section 50, the delay section 52 includes five shift registers 52A to 52E each of which is serially connected to one another. Each register 52A to 52E delays the detection result x(k+3) for a period of one clock, and that produces detection results of x(k+2) to x(k−2) which are then supplied to the pattern selector 53.

The pattern selector 53 sets a tentative determined pattern where the six detection results x(k+3) to x(k−2) have been ordered by time as a target of determination. Only when the tentative determined pattern matches a specific pattern of "+1, +1, +1, −1, −1, −1" or "−1, −1, −1, +1, +1, +1", the pattern selector 53 supplies the detection results of x(k) and x(k+1), which are adjacent to a changing point on the detection results x (i.e. a changing point of the codes of the interpolated signals pk), and the current interpolated signals p(k) and p(k+1) to a phase detector 54.

In this case, in the pattern selector 53, the specific pattern includes three successive "+1" and "−1". Therefore, a part of the detection results x including only two successive "+1" or "−1" (i.e. including 2T) does not match the specific pattern.

That means that the pattern selector 53 excludes, out of changing points of the codes of the interpolated signals pk, one that has the shortest wavelength or 2T, and then supplies the rest of them to the phase detector 54.

In this manner, the pattern selector 53 excludes the changing point of codes having 2T in which frequency errors are not easily detected due to high frequency and its shortest wavelength. This allows the subsequent sections to detect frequency errors more accurately.

The phase detector 54 adds together the interpolated signals p(k) which exist before and after the changing point of codes to obtain the phase error $\Delta\tau k$ which is then supplied to a nest stage of a difference calculator 55. That calculation is as follows:

$$x(k)=-1, x(k+1)=+1: \Delta T(k)=+(y(k)+y(k+1))$$

$$x(k)=+1, x(k+1)=-1: \Delta T(k)=-(y(k)+y(k+1))$$

$$\text{else: } \Delta T(k)=\Delta T(k-1) \quad (3)$$

In this case, the phase detector 54 assumes that the waveform of the interpolated signals p(k) is almost linear around the changing point of codes. That is to say, the added value of the interpolated signals p(k) around the changing point of codes are almost proportionate to the magnitude of the phase error (In other words, the added value is a difference value between absolute values).

As indicated by the formula (3), the phase detector 54 holds the previous phase error $\Delta\tau(k-1)$ outside the changing point of codes, and then outputs the phase error $\Delta 96$ (k−1) as the phase error $\Delta\tau(k)$. The following is the reason: even though the phase detector 54 may not be able to calculate the phase error $\Delta\tau(k)$ on any points other than the changing point of codes, the phase error $\Delta\tau(k)$ can be approximated by the previous phase error $\Delta\tau(k-1)$ because the phase error $\Delta\tau(k)$ probably does not change rapidly for a period of one clock. In this case, the phase error $\Delta\tau(k)$ can be approximated more correctly compared to a case where the phase error $\Delta\tau(k)$ is approximated by zero.

The difference calculator 55 calculates by 1-D, which is to say the difference calculator 55 calculates a difference between the phase error $\Delta\tau(k)$ and the phase error $\Delta\tau(k-1)$ which is one clock before to obtain differential coefficients of the phase error $\Delta\tau(k)$. In general, the frequency error can be obtained by differentiating the phase error. Accordingly, assume that the differential coefficient is the frequency error of $\Delta f0(k)$. In this manner, the difference calculator 55 obtains the frequency error $\Delta f0(k)$, and then supplies it to a discontinuous value exclusion section 56.

Figure 8:
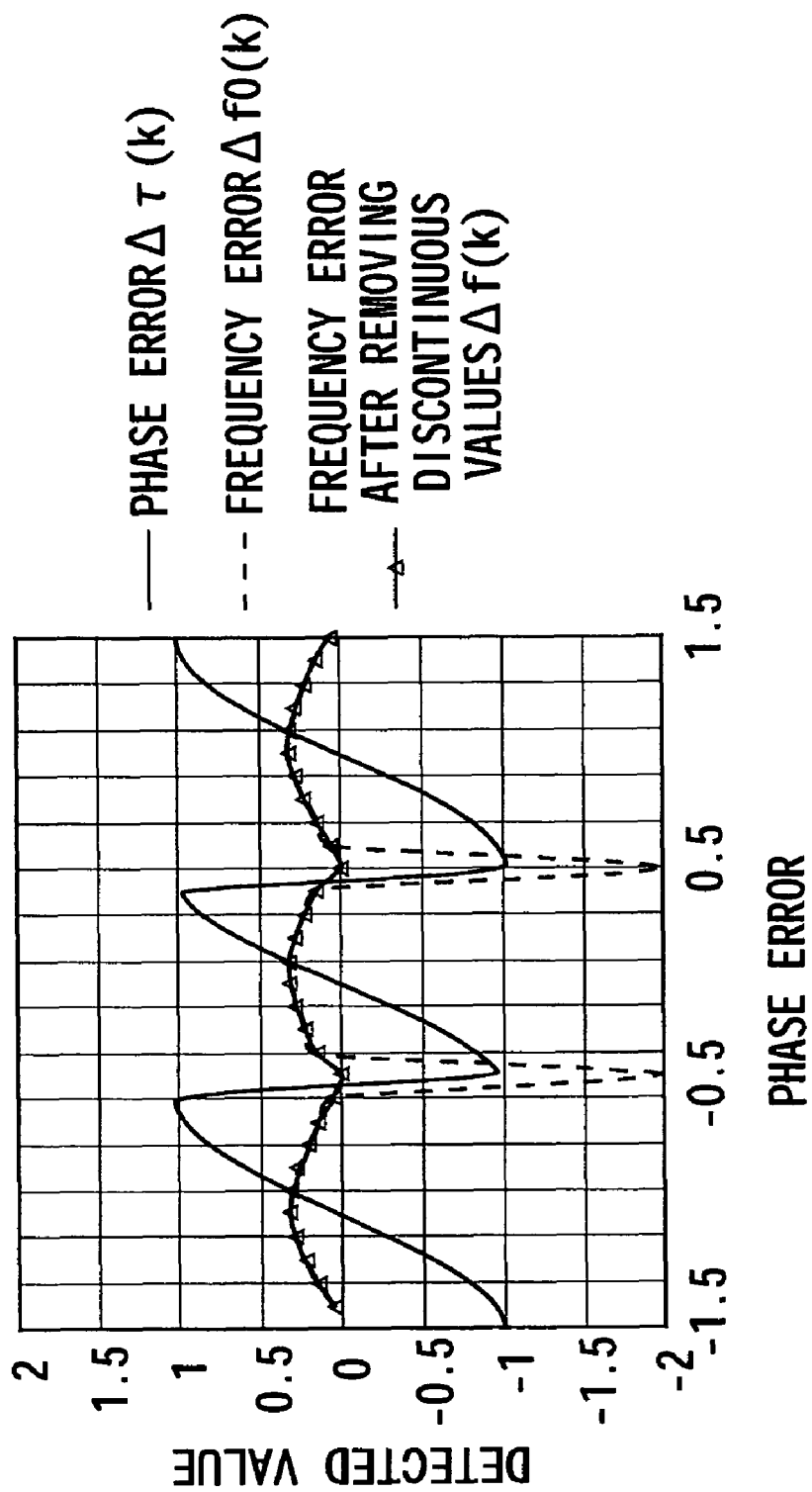
FIG. 8 is a schematic diagram illustrating the relationship between phase and frequency errors.
Figure 9:
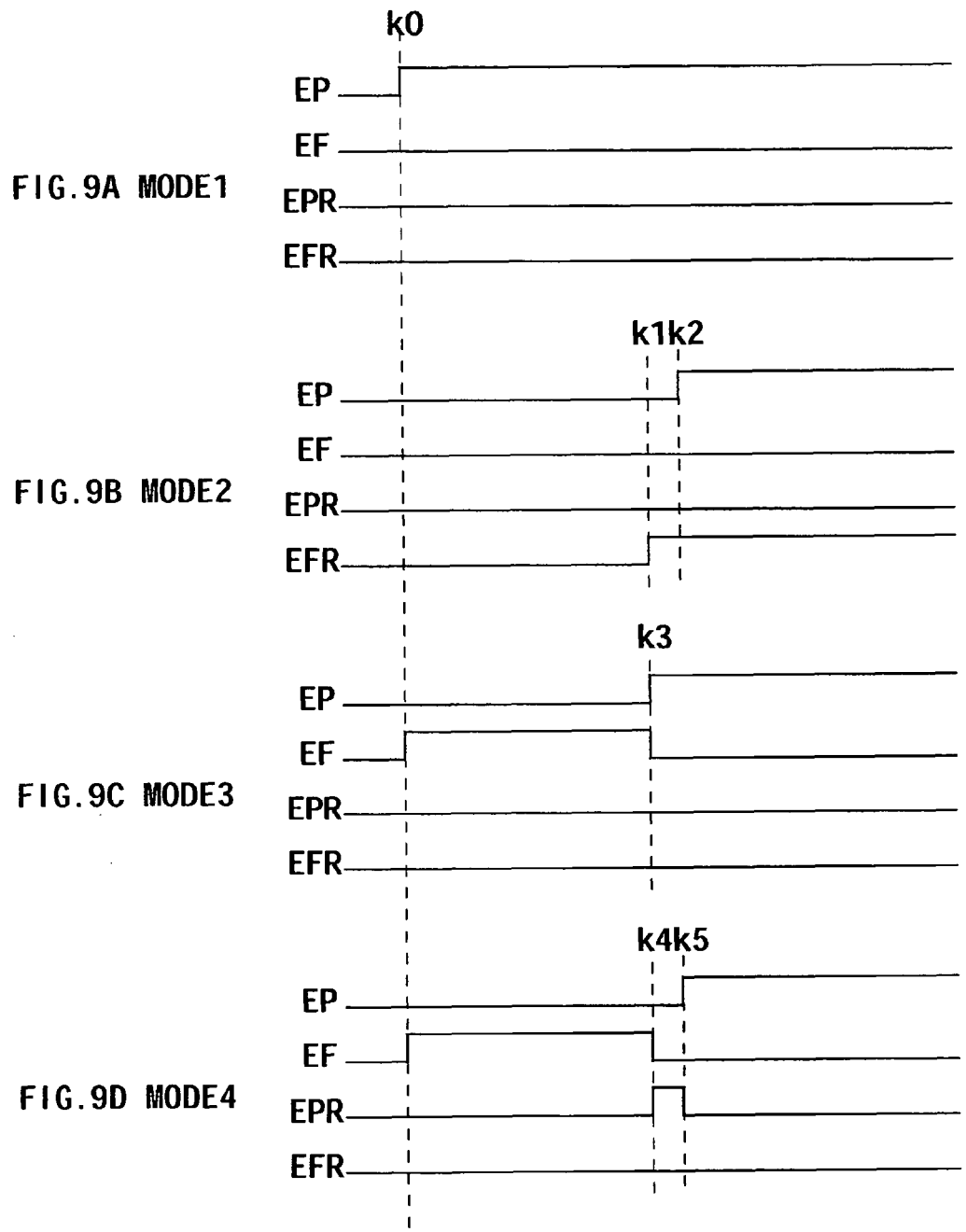
FIG. 9A to 9D are timing charts illustrating timing of controlling switches in each operation mode.

By the way, FIG. 8 shows the relationship between the actual phase errors and the detected values (or the phase error $\Delta\tau(k)$) by solid lines, and the frequency errors $\Delta f0(k)$ by dotted lines. As shown in FIG. 8, around the continuous portion of the phase error $\Delta\tau(k)$ (where the detected value changes within a range of −1 to +1), the detected value of the frequency error $\Delta f0(k)$ changes continuously within a range of 0 to 0.5. On the other hand, when the phase error $\Delta\tau(k)$ changes to a reversed phase (when the detected value becomes −1 or +1), the detected value of the frequency error $\Delta f0(k)$ becomes discontinuous negative values compared to the adjacent parts.

In this case, the discontinuous negative values of the frequency error $\Delta f0(k)$ has been affected by the discontinuous parts of the phase error $\Delta\tau(k)$, and that does not represent real frequency errors. If the frequency error detection circuit 33 uses that frequency error $\Delta f0(k)$ for the subsequent process, it may take time for the phase synchronization section 8 (FIG. 3) to exclude the influence of the frequency error, or the phase synchronization section 8 may fail to exclude the influence.

Accordingly, when the absolute value of the frequency error $\Delta f0(k)$ is less or equal to a predetermined threshold TH ("1" for example), the discontinuous value exclusion section 56 assumes that the value of the frequency error $\Delta f0(k)$ is correct; when the absolute value is greater than the threshold TH, the discontinuous value exclusion section 56 assumes that the value of the frequency error $\Delta f0(k)$ is incorrect and then replaces it with zero. That process is as follows:

$$abs(\Delta f0(k)) < TH: \Delta f(k) = \Delta f0(k)$$

$$\text{else: } \Delta f(k) = 0 \quad (4)$$

In this manner, the discontinuous value exclusion section 56 excludes the discontinuous values to obtain the frequency error $\Delta f(k)$, and then supplies the frequency error $\Delta f(k)$ to the switch 36 (FIG. 3) and a moving average calculator 57.0.

The moving average calculator 57 calculates a moving average of the frequency error $\Delta f(k)$. In this manner, the moving average calculator 57 processes the frequency error $\Delta f(k)$ statistically to obtain an average frequency error $\Delta fa(k)$, and then supplies the average frequency error $\Delta fa(k)$ to the switch 39 (FIG. 3).

In this manner, the frequency error detection circuit 33 calculates, based on the interpolated signal pk, the phase error $\Delta\tau(k)$, and then generates, based on the differential coefficient of the phase error $\Delta\tau(k)$, the frequency error $\Delta f(k)$ and the average frequency error $\Delta fa(k)$.

(2-2) Correction of Frequency Error

The phase synchronization section 8 under the control of the timing manager 43 switches the switches 31, 36, 39 and 42 on or off to correct the frequency errors (described below).

(2-2-1) Correction of Frequency Error by Loop

The phase synchronization section 8 supplies the frequency error $\Delta f(k)$, which is supplied from the frequency error detection circuit 33, to a multiplier 35. The multiplier 35 has received a coefficient γ1. The multiplier 35 multiplies the frequency error $\Delta f(k)$ by the coefficient γ1 to produce a frequency correction value DF, and then supplies the frequency correction value DF to the switch 36.

The coefficient γ1 is equivalent to a gain of loop, one that has been set based on the relationship between the value of the frequency error $\Delta f(k)$ and the frequency correction value DF appropriate to the frequency error $\Delta f(k)$.

When the switch 36 has been switched on, the phase synchronization section 8 supplies the frequency correction value DF to the accumulator 25C of the LPF 25. In response, the LPF 25 calculates, based on the frequency correction value DF, the difference of timings vk, and then supplies the difference of timings vk to the NCO circuit 26.

At this time, based on the frequency correction value DF generated by multiplying the frequency error $\Delta f(k)$ by the coefficient γ1, the LPF 25 can calculate the difference of timings vk which can lead to the proper correction of the frequency error $\Delta f(k)$ at this time. In response to that, the NCO circuit 26 calculates the sampling phase μk which is able to bring the frequency error $\Delta f(k)$ closer to zero, and then supplies the sampling phase μk to the interpolator 22.

The phase synchronization section 8 also switches other switches, such as the switch 31, off. In this manner, a primary loop related to the frequency error Δf(k) (also referred to as a frequency convergence loop) is configured, including the interpolator 22, the frequency error detection circuit 33, the multiplier 35, the LPF 25 and the NCO circuit 26. While the switch 36 is being switched on, the frequency convergence loop repeatedly performs a series of processes.

In this manner, while the switch 36 is being switched on, the phase synchronization section 8 calculates, based on the frequency error Δf(k) supplied from the frequency error detection circuit 33, the frequency correction value DF, and then brings the frequency error Δf(k) close to zero by supplying the difference of timings νk, which is based on the frequency correction value DF, to the NCO circuit 26. The phase synchronization section 8 repeats those processes to bring the frequency error Δf(k) to zero.

(2-2-2) Correction of Frequency Error by Initially-Set Value

On the other hand, the phase synchronization section 8 supplies the average frequency error Δfa(k), which is supplied from the frequency error detection circuit 33, to a multiplier 38. The multiplier 38 has received a coefficient γ0. The multiplier 38 multiplies the average frequency error Δfa(k) by the coefficient γ0 produce an average frequency correction value DFA, and then supplies the average frequency correction value DFA to the switch 39.

Like the coefficient γ1, the coefficient γ0 is one that has been set based on the relationship between the value of the average frequency error Δfa(k) and the average frequency correction value DFA appropriate to the average frequency error Δfa(k).

The average frequency correction value DFA has been calculated statistically as a moving average of the frequency error Δf(k) by the frequency error detection circuit 33, and it is based on the average frequency error Δfa(k). This allows correcting the frequency error Δf(k) correctly at one time.

While the switch 39 is being switched on, the phase synchronization section 8 supplies the average frequency correction value DFA to the shift register 25E of the LPF 25. At this time the phase synchronization section 8 switches the switch 31 off. Accordingly, a loop related to the frequency error Δf(k) (also referred to as a frequency initial value loop) is configured, including the interpolator 22, the frequency error detection circuit 33, the multiplier 35, the LPF 25 and the NCO circuit 26.

In response to that, the LPF 25 calculates the difference of timings νk based on the average frequency correction value DFA, and then supplies the difference of timings νk to the NCO circuit 26. At this time, based on the average frequency correction value DFA generated by multiplying the average frequency error Δf(k) by the coefficient γ0, the LPF 25 can calculate the difference of timing νk, which allows correcting the current frequency error Δf(k) correctly at one time.

That is to say, the LPF 25 has received the average frequency correction value DFA as initial values. This allows the LPF 25 to bring the frequency error of the phase synchronization section 8 almost close to zero at the first stage of the loop process. Therefore, the LPF 25 can supply the difference of timing νk, which allows doing frequency-restart, to the NCO circuit 26.

Based on the difference of timing νk generated based on the average frequency correction value DFA, the NCO circuit 26 generates the sampling phase μk, and then supplies the sampling phase μk to the interpolator 22. Based on the sampling phase μk, the interpolator 22 corrects the frequency of the sampling clock to bring the frequency error, which is the frequency lag between the sampling clock and the target phase, almost close to 0 by one-time process.

In this manner, while the switch 39 is being switched on, the phase synchronization section 8 calculates, based on the average frequency error Δfa(k) supplied from the frequency error detection circuit 33, the average frequency correction value DFA, and then the frequency initial value loop brings, using the average frequency correction value DFA, the frequency error Δf(k) almost close to zero during one-time process.

(2-3) Correction of Phase Error

In this manner the phase synchronization section 8 can slowly correct the frequency errors by the convergence loop; and it also can correct the frequency error by one-time process of the frequency initial value loop such that the frequency error is almost close to zero. In addition to that, the phase synchronization section 8 can correct phase errors by one-time process to be almost close to zero.

The phase synchronization section 8 includes a moving average calculation circuit 40. The phase error detector 24 supplies the phase error Δτk to the moving average calculation circuit 40.

The moving average calculation circuit 40 calculates a moving average of the phase errors ττk for a predetermined period of time to generate an average phase error Δτak, one obtained by statistically processing a plurality of the phase errors Δτk. The moving average calculation circuit 40 then supplies the average phase error Δτak to a multiplier 41. The multiplier 41 has received a coefficient γ2. The multiplier 41 calculates an average phase correction value DPA by multiplying the average phase error Δτak by the coefficient γ2, and then supplies the average phase correction value DPA to a switch 42.

The coefficient γ2 is a predetermined coefficient, which is set based on the relationship between the average phase error Δτak and the average phase correction value DPA appropriate to the average phase error Δτak. The coefficient γ2 is equivalent to a gain of the phase initial value loop.

The average phase correction value DPA is based on the average phase error Δτak which is calculated as moving average of the phase error Δτk by the moving average calculation circuit 40. Accordingly, the average phase correction value DPA is one capable of correcting the phase error Δτk during one-time process, bringing the phase error Δτk almost close to zero.

Accordingly, while the switch 42 is being turned on, the phase synchronization section 8 can supply the average phase correction value DPA, which allows bringing the phase error of the phase synchronization section 8 almost close to zero during one-time process, to the NCO circuit 26 as initial value.

At this time, the phase synchronization section 8 switches the switch 31 off. This forms a loop related to the phase error Δτk (also referred to as a phase initial value loop) including the interpolator 22, the PR equalizer 23, the phase error detector 24, the moving average calculation circuit 40, the multiplier 41 and the NCO 26.

By the way, the NCO 26 calculates, based on the difference of timings νk, the sampling phase μk as follows:

$$\mu(k+1) = [\mu k + \epsilon(1-\nu k)]_{mod-1} \quad (5)$$

where ε represents an oversampling rate at the interpolator 22.

In the phase initial value loop, the NCO 26 replaces the sampling phase μk of formula (5) with the sampling phase μk of the following formula:

$$\mu k = \mu k + DPA \times \gamma 2 \times \epsilon \quad (6)$$

This means that the phase synchronization section 8 performs phase synchronization process after setting the average phase correction value DPA as initial value and then correcting the phase error Δτk almost close to zero: the phase synchronization section 8 does a so-called zero-phase restart.

In this manner, when the switch 42 is switched on and the switch 31 is switched off, the phase synchronization section 8 calculates, based on the average phase error Δτak supplied from the moving average calculation circuit 40, the average phase correction value DPA, and corrects, using the average phase correction value DPA as initial value, the phase error Δτk almost close to zero during one-time process by the phase initial value loop.

(2-4) Control of Timing

The phase synchronization section 8 controls, by the timing manager 43, the switches 31, 36, 39 and 42. This leads to one of the following loops: the phase convergence loop shown in FIG. 2, the frequency convergence loop, the frequency initial value loop, and the phase initial value loop.

Actually, the timing manager 43 outputs one of the following signals: a phase convergence loop switching signal EP which controls the switch 31 to help the phase synchronization section 8 to be the phase convergence loop; a frequency convergence loop switching signal EF which controls the switch 36 to help the phase synchronization section 8 to be the frequency convergence loop; a frequency initial value loop switching signal EFR which controls the switch 39 to help the phase synchronization section 8 to be the frequency initial value loop; and a phase initial value loop switching signal EPR which controls the switch 42 to help the phase synchronization section 8 to be the phase initial value loop.

As shown in FIG. 9A to 9D, the timing manager 43 further includes four types of operation modes 1 to 4 where timings to enable or disenable the following signals have been predetermined: the phase convergence loop switching signal EP, the frequency convergence loop switching signal EF, the frequency initial value loop switching signal EFR and the phase initial value loop switching signal EPR. Based on a mode control signal CM supplied from the control section 2 (FIG. 1), the timing manager 43 changes the operation mode.

By the way, in FIG. 9A to 9D, a high level signal "H" means that corresponding switches are turned on, while a low level signal "L" means that corresponding switches are turned off.

When the operation mode is switched to the mode 1, as shown in FIG. 9A, the timing manager 43 forces the phase synchronization section 8 to be the phase convergence loop at the first stage of clock, or clock k0, to bring the phase error closer to zero.

When the operation mode is switched to the mode 2, as shown in 9B, the timing manager 43 does not do anything at clock k0, and forces the phase synchronization section 8 to be the frequency initial value loop at clock k1, and then changes that loop to the phase convergence loop at next clock k2. The phase synchronization section 8 therefore corrects the frequency error almost close to zero at one-time process using the average frequency error Δfa(k), and then slowly bringing the phase error close to zero.

When the operation mode is switched to mode 3, as shown in FIG. 9C, the timing manager 43 forces the phase synchronization section 8 to be the frequency convergence loop at clock k0, and, after a while, changes the loop to the phase convergence loop at clock k3. In this manner, the phase synchronization section 8 gradually brings the frequency error to zero using the frequency error Δf(k), and then slowly bringing the phase error close to zero.

When the operation mode is switched to mode 4, as shown in FIG. 9D, the timing manager 43 forces the phase synchronization section 8 to be the frequency convergence loop at clock k0, and, after a while, brings the loop to the phase initial value loop at clock k4, and then switches that loop to the phase convergence loop at next clock k5. In this manner, the phase synchronization section 8 brings, based on the frequency error Δf(k), the frequency error close to zero gradually, and calculates the average phase error Δτak, or the moving average of the phase error Δτk, and then corrects, based on the average phase error Δτak, the phase error almost close to zero to keep the phase error closer to zero.

In this manner, the phase synchronization section 8 switches, based on the mode control signal CM from the control section 2, the operation mode: based on the timings shown in FIG. 9A to 9D, the phase synchronization section 8 controls the switches 31, 36, 39 and 42 to bring the phase synchronization section 8 to the phase convergence loop, the frequency convergence loop, the frequency initial value loop or the phase initial value loop to stably correct the frequency and phase errors to zero at high speed.

(3) Operation and Effect

In the optical disc device 1 with the above configuration, the phase synchronization section 8 includes not only the basic configuration of digital PLL circuit (FIG. 2), but the frequency error detection circuit 33 (FIG. 3) to calculate the frequency error Δf(k) of the interpolated signal pk.

At this time, the frequency error detection circuit 33 calculates, by the difference calculator 55, the difference between the phase error Δτ(k) supplied from the phase detector 54 (FIG. 7) and the previous phase error Δτ(k−1) (which is one obtained one clock before). Therefore, the frequency error detection circuit 33 obtains the frequency error Δf0($k$) as differential coefficient of the phase error Δτ(k). In this manner, the accurate frequency error Δf0($k$) can be obtained by easy calculation process.

In addition, the frequency error detection circuit 33 outputs, by the phase detector 54, the previous phase error Δ96 (k−1) as phase error Δτ(k) outside the changing points of codes. Therefore, even if the phase error Δτ(k) becomes "0" or other values outside the changing points of codes, the subsequent difference calculator 55 can calculate frequency error correctly.

In addition, only when, on the pattern selector 53, the detected results match the specific pattern of "+1, +1, +1, −1, −1, −1" or "−1, −1, −1, +1, +1, +1", the frequency error detection circuit 33 supplies the following signals to the phase detector 54: the detection results of x(k) and x(k+1), which are before and after the change of the detection result x; and the interpolated signal p(k) and p(k+1) at this time. Therefore, the frequency error detection circuit 33 detects the changing points of codes, except those having the shortest wavelength of 2T (or the pattern of "−1, +1, +1, −1" or "+1, −1, −1, +1"), and then supplies them to the phase detector 54.

In this manner, the frequency error detection circuit 33 can exclude the changing point of codes with 2T where it is hard to detect the frequency error Δf(k) correctly due to higher frequency and shorter wavelength. This maintains high accurate detection of the frequency error Δf(k).

Furthermore, in the frequency error detection circuit 33, the discontinuous value exclusion section 56 excludes, from the frequency error Δf0($k$), the discontinuous values (FIG. 8), or the improper part of the frequency error Δf0($k$) where the phase errors Δτ(k) are discontinuous, and then supplies the resultant frequency error Δf(k) to the subsequent circuit. This maintains the accuracy of the frequency error Δf(k).

On the other hand, while the switch 36 is being switched on, the phase error synchronization section 8 multiplies the frequency error Δf(k), which is detected by the frequency error detection circuit 33, by the coefficient γ1 to obtain the frequency correction value DF, one appropriate for correcting the frequency error Δf(k).

While the switch 36 is being switched on, the phase synchronization section 8 repeatedly performs a series of processes of the frequency convergence loop to bring the frequency error Δf(k) to zero by applying the frequency correction value DF to integral terms of the LPF 25 and the difference of timings νk to the NCO 26. In this manner, the frequency error Δf(k) is gradually brought to zero.

In addition, when the switch 39 is switched on, the phase synchronization section 8 multiplies the average frequency error Δfa(k), which is calculated as moving average of the frequency error Δf(k) by the frequency error detection circuit 33, by the coefficient γ0 to obtain the average frequency correction value DFA appropriate for correcting the average frequency error Δfa(k), which is then supplied to the LPF 25.

At this time, the frequency error detection circuit 33 of the phase synchronization section 8 continues to calculate the moving averages of the frequency errors Δf(k) during a predetermined period of time (i.e. a predetermined calculation period) until the switch 39 is switched on. This obtains the high-accurate frequency error Δf(k), or the average frequency error Δfa(k).

Accordingly, when the switch 39 is switched on, the phase synchronization section 8 supplies the difference of timings νk, which has been originated from the high-accurate frequency error Δf(k), to the NCO 26 by applying the average frequency correction value DFA, which is based on the average frequency error Δfa(k), to the integral terms of the LPF 25 only one time (one clock). In this manner, the process of frequency restart can be performed, correcting the frequency error Δf(k) almost close to zero during one-cycle process of the frequency initial value loop.

In this manner, the phase synchronization section 8 forms the frequency convergence loop or the frequency initial value loop to correct the frequency error Δf(k) almost close to zero by adding one of the following values to the integral term of the LPF 25: the frequency correction value DF based on the frequency error Δf(k), and the average frequency correction value DFA based on the average frequency error Δfa(k).

In addition, the phase initial value loop of the phase synchronization section 8 processes phases in the same way as the frequency initial value loop. This calculates the highly accurate phase error Δτk, or the average phase error Δτak. The phase synchronization section 8 then calculates the average phase correction value DPA by multiplying the average phase error Δτak by the coefficient γ2, and then supplies the average phase correction value DPA to the NCO 26 to correct the phase error Δτk almost close to zero during one-time process.

In addition, based on the mode control signal CM from the control section 2 (FIG. 1), the phase synchronization section 8 switches the operation mode of the timing manager 43 to one of the modes 1 to 4 (FIG. 9A to 9D). In accordance with the operation mode, the phase synchronization section 8 controls the switches 31, 36, 39 and 42. In this manner, the supplied mode control signal CM leads the timing manager 43 to the phase convergence loop, the frequency convergence loop, the frequency initial value loop or the phase initial value loop at predetermined timings.

For example, when the operation mode is switched to mode 1 (FIG. 9A), the phase synchronization section 8 gradually corrects the phase error Δτk by the basic configuration of the phase convergence loop (FIG. 2) without correcting the frequency error Δf(k).

Figure 10:
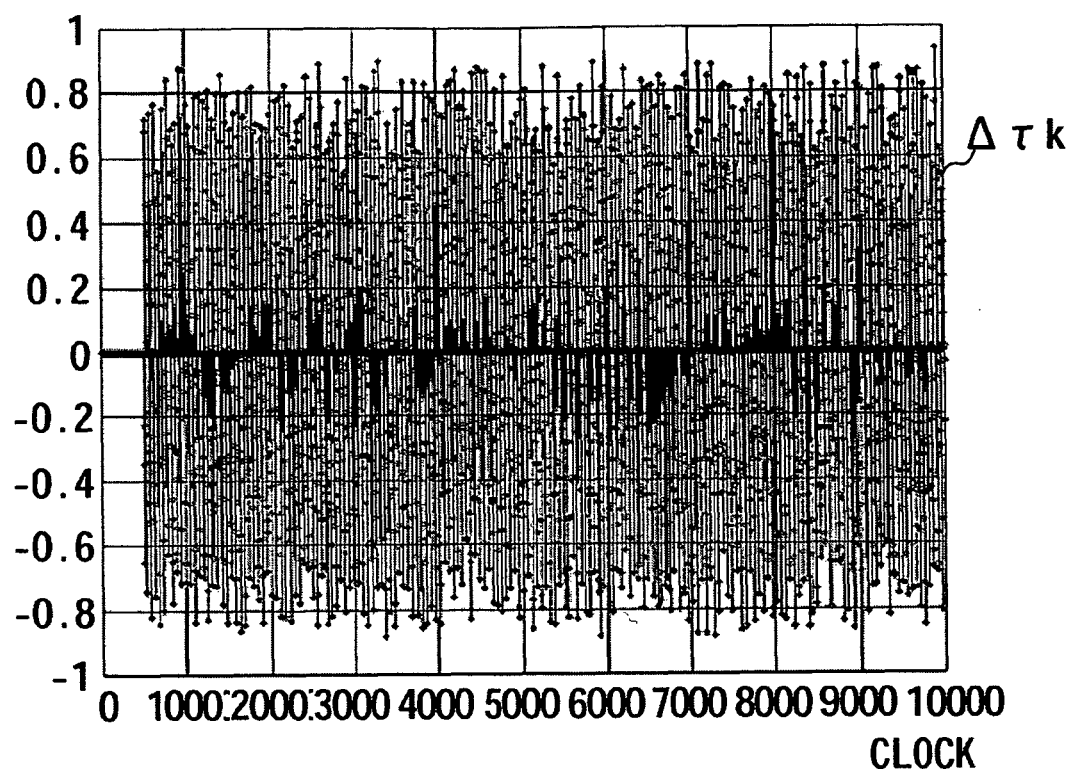
FIG. 10 is a schematic diagram showing a result of simulation on mode 1.

However, as shown in FIG. 10 (waveforms), if the frequency error is relatively big (about 2%), the phase synchronization section 8 may not be able to correct the phase and frequency errors by the phase convergence loop even after about 10,000 clocks. In other words, the digital input signal DI overwhelms the capture range in the phase synchronization section 8.

By contrast, when the operation mode 3 is switched to mode 3, the phase synchronization section 8 gradually corrects the frequency error close to zero by the frequency convergence loop, and then corrects the phase error close to zero by the phase convergence loop.

Figure 11:
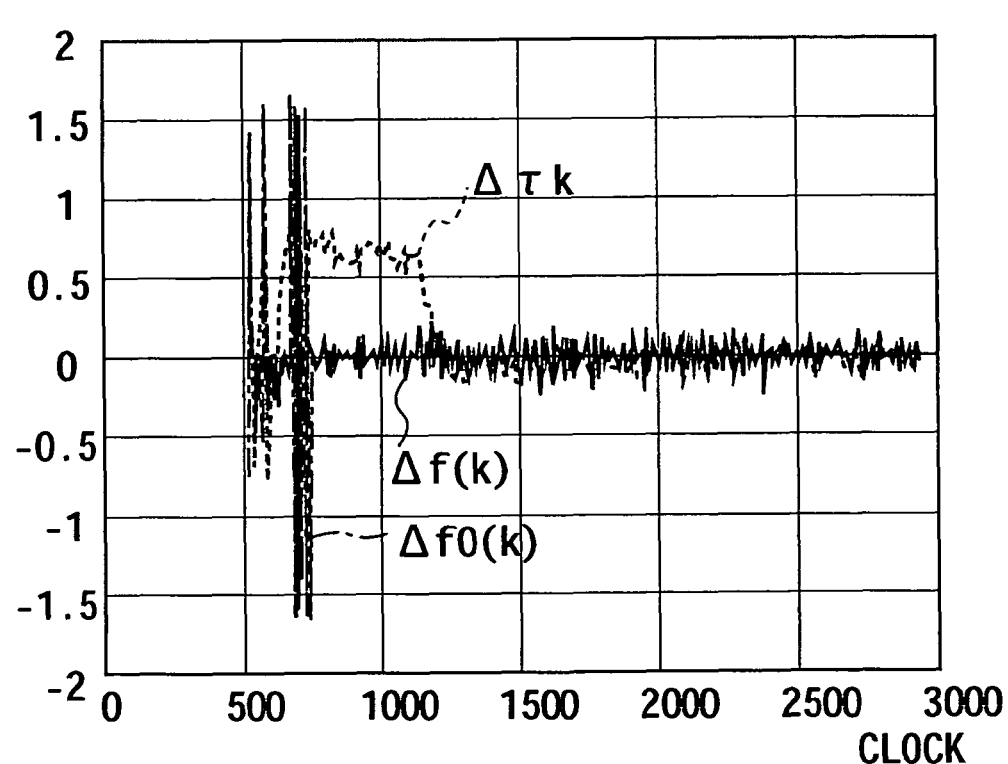
FIG. 11 is a schematic diagram showing a result of simulation on mode 3.

In the phase synchronization section 8 with mode 3, as shown in FIG. 11 for example (waveforms), if the frequency error is relatively big like that of FIG. 10, the frequency error Δfk (solid lines in FIG. 11) and the phase error Δτk (dotted lines in FIG. 11) dramatically changes around 500 clocks when the process of the frequency convergence loop began, however, around 750 clocks, the frequency error Δfk becomes a relatively low value and also the phase error Δτk is brought into a certain range of values. In this manner, the frequency error Δfk can be brought to almost zero.

After that, the phase synchronization section 8 switches to the phase convergence loop at approximately 1200 clocks to rapidly and stably bring the phase error Δτk to zero.

That is to say, even when the frequency error of the digital input signal DI is relatively large (about 2%), the phase synchronization section 8 can bring the frequency error Δfk to zero by the frequency convergence loop like that of mode 3. This makes the capture range larger than that of mode 0.

By the way, in FIG. 11, because the phase error Δτk has "overleaped (jumped)", the frequency error Δf0(k), before removing discontinuous parts, is over ±1 and being spike-like waveform (dashed lines in FIG. 11). However, the frequency error Δf(k), after removing discontinuous parts, is within ±1. This means it is effective to remove discontinuous parts from the frequency error Δf0(k) to obtain the frequency error Δf(k).

Figure 12:
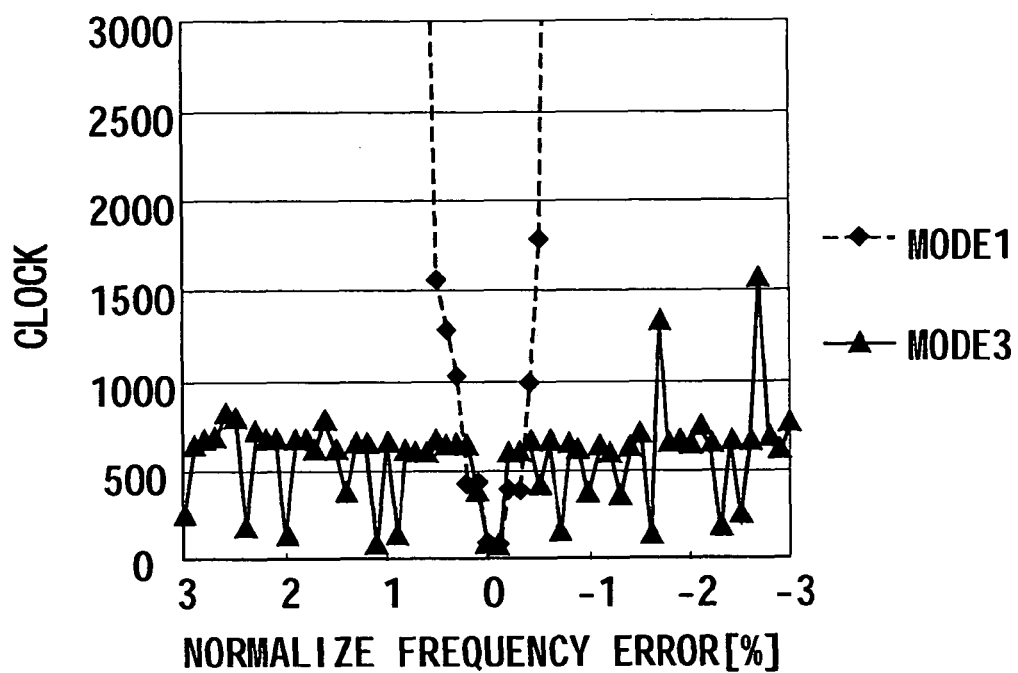
FIG. 12 is a schematic diagram illustrating the number of clocks to be spent on phase synchronization.

FIG. 12 shows a result of simulation to illustrate the number of clocks during a period of time until the synchronization of phase is completed (i.e. until the phase error is brought to almost zero): the phase synchronization section 8 operates in modes 1 and 3, and the frequency of the digital input signal DI changes in various manners.

As shown in FIG. 12, in the mode 1 where the phase synchronization section 8 does not correct the frequency errors, the phase synchronization section 8 has difficulty in synchronizing the phases when the frequency error is over approximately ±0.3%. That is to say, even when the capture range is about ±0.3%, in the mode 3 where the phase synchronization section 8 corrects the frequency error to zero, even if the frequency error is over ±0.3%, the phase synchronization section 8 can correct the frequency error during a relatively short term of a few clocks. That means that the capture range becomes approximately 3% larger (more than 10 times).

In addition to that, the interpolator 22 of the phase synchronization section 8 applies the filter coefficients h(0) to h(n−1), which are calculated by the above formula (1) or the function g(i), to the coefficients of the FIR filter. This emphasizes the high frequency range of the digital input signal DI to generate the interpolated signal pk.

Figure 13:
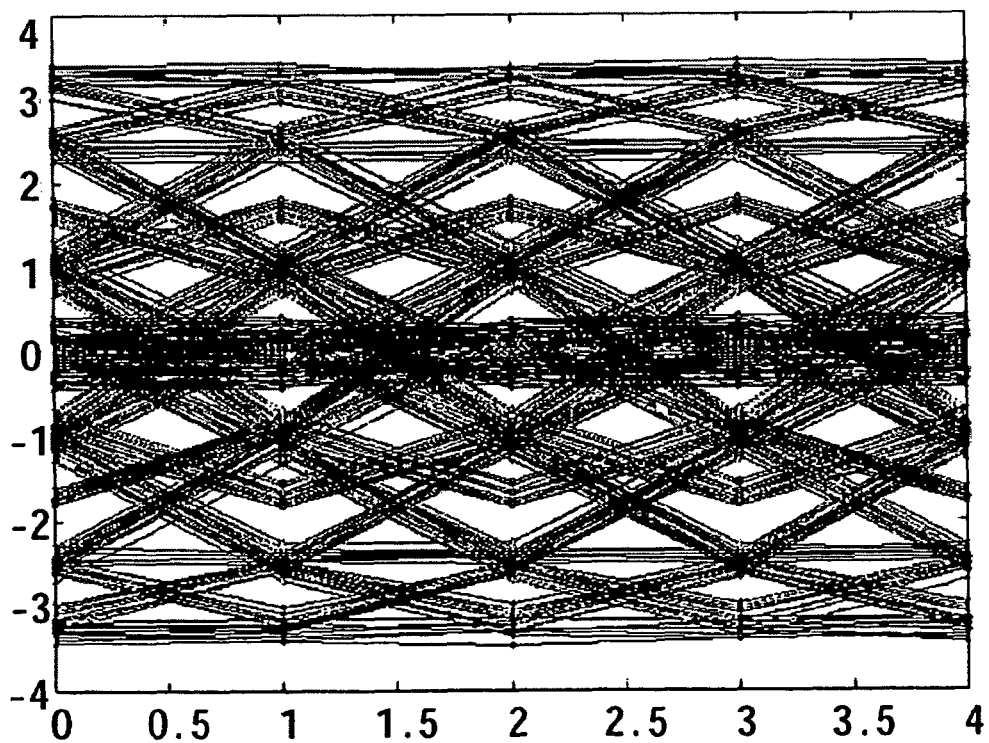
FIG. 13 is a schematic diagram showing an eye pattern of an interpolated signal.

For example, if the interpolation filter coefficient calculation section 22A (FIG. 4) utilizes the Sinc function as the filter coefficients h(0) to h(n−1) like those of the Non-Patent Documents 1 and 2, there is a possibility that the eye pattern of the interpolated signal pk output from the interpolator 22 is not enough open at the point of the shortest wavelength as shown in FIG. 13.

If the eye pattern is not enough open, the phase synchronization section may fail to detect zero-crossing or the like later.

Figure 14:
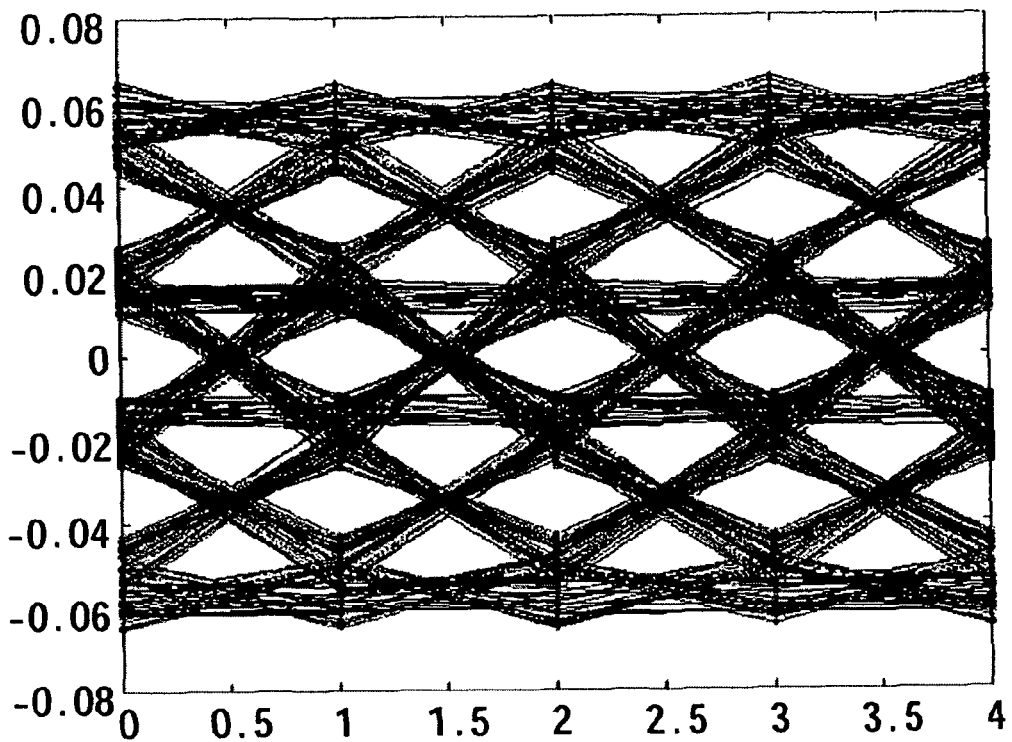
FIG. 14 is a schematic diagram showing an eye pattern of an interpolated signal whose high frequency range has been emphasized.

By contrast, in this embodiment, the interpolator 22 of the phase synchronization section 8 applies the filter coefficients h(0) to h(n−1), which are calculated by the function g(i), to the coefficients of the FIR filter. This emphasizes the high frequency range of the digital input signal DI. Accordingly, as shown in FIG. 14, the eye pattern of the interpolated signal pk is open enough to correctly detect zero-crossing or the like at the subsequent stages.

In the phase synchronization section 8 of the optical disc device 1 with the above configuration, the frequency error detection circuit 33 accurately and easily calculates, based on the difference between the phase error Δτ and the phase error Δτ(k−1) that is one clock before, the frequency error Δf(k) of the interpolated signal pk. The synchronization section 8 then forms the frequency convergence loop or the frequency initial value loop, and adds the frequency correction value DF, which is based on the frequency error Δf(k), or the average frequency correction value DFA, which is based on the average frequency error Δfa(k), to the integral terms of the LPF 25. That allows the phase synchronization section 8 to rapidly and stably bring the frequency error Δf(k) almost close to zero.

(4) Other Embodiments

In the above-noted embodiment, the phase synchronization section 8 with the configuration of digital PLL circuit is applied. However the present invention is not limited to this. For example, the phase synchronization section 8 may include not only digital circuits but analog circuits.

Figure 15:
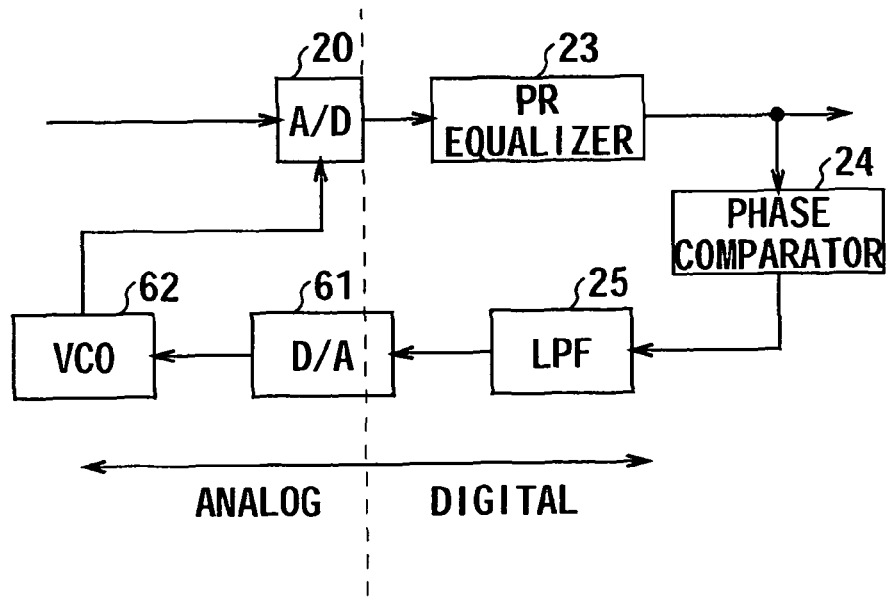
FIG. 15 is a block diagram showing the basic circuit configuration of a phase synchronization section having both analog and digital sections.

For example, FIG. 15 shows the basic configuration of circuits (the parts of FIG. 15 have been designated by the same symbols and marks as the corresponding parts of FIG. 2). Instead of the oscillator 21, the interpolator 22 and the NCO 26, a phase synchronization section 60 includes a digital to analog (D/A) converter 61 and a Voltage Controlled Oscillator (VCO) 62.

Figure 16:
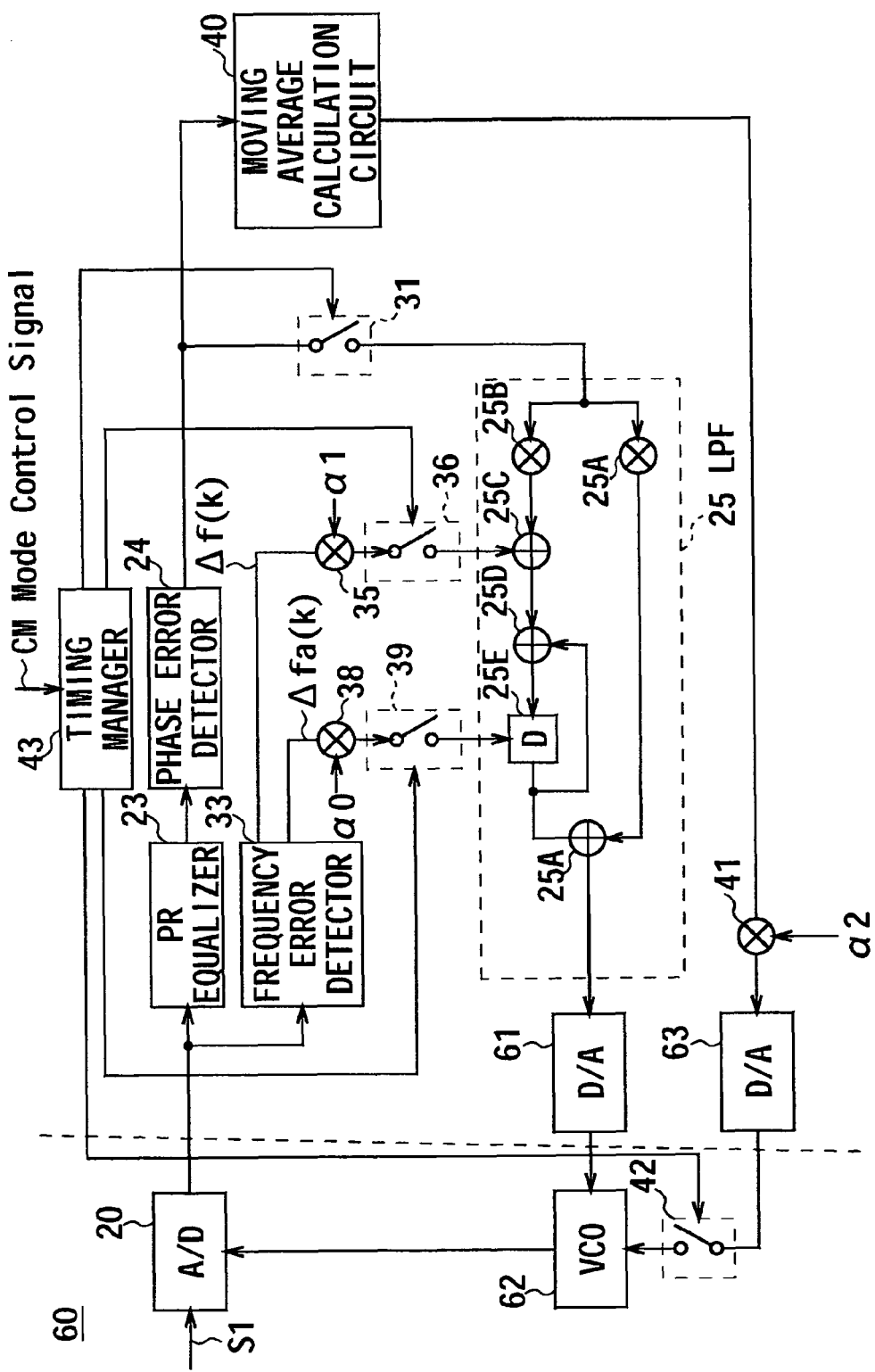
FIG. 16 is a block diagram showing the detailed circuit configuration of the phase synchronization section having both analog and digital sections.

FIG. 16 shows the detailed configuration of the phase synchronization section 60 (the parts of FIG. 16 have been designated by the same symbols and marks as the corresponding parts of FIG. 3). The frequency error detection circuit 33 of the phase synchronization section 60 detects, based on the phase error Δτk, the frequency error Δf(k) and the average frequency error Δfa(k) in the same way as that of the phase synchronization section 8. Based on the frequency error Δf(k) and the average frequency error Δfa(k), the phase synchronization section 60 brings the frequency error almost close to zero by its frequency convergence loop or frequency initial value loop.

In addition, in the above-noted embodiment, the phase detector 54 (FIG. 9) of the frequency error detection circuit 33 outputs the previous phase error Δτ(k−1) as phase error Δτ(k) when it is outside the changing point of codes, as indicated by the formula (3). However the present invention is not limited to this. The phase detector 54 may output other values when it is outside the changing point of codes: a predetermined value (0.2, for example), a value predicted from the previous phase error Δτ(k−1), and the like.

Furthermore, in the above-noted embodiment, only when the detected results match the specific pattern of "+1, +1, +1, −1, −1, −1" or "−1, −1, −1, +1, +1, +1", the pattern selector 53 (FIG. 9) of the frequency error detection circuit 33 supplies the detected results of x(k) and x(k+1) (which are the changing points of the detected result x) and the current interpolated signals p(k) and p(k+1) to the phase detector 54 to exclude the changing point of codes with the shortest wavelength of 2T.

However the present invention is not limited to this. The pattern selector 53 may use other specific patterns to exclude the changing points of codes of other recording marks.

If it is evident that the frequency error be detected correctly around the changing points of codes with 2T, the pattern selector 53 may be omitted.

Furthermore, in the above-noted embodiment, the discontinuous value exclusion section 56 utilizes the threshold TH (+1, for example) to exclude the discontinuous values of the frequency error Δf0(k). However the present invention is not limited to this. The threshold TH may take other values (except zero). The discontinuous value exclusion section 56 may include a hysteresis comparator.

Alternatively, the discontinuous value exclusion section 56 may be omitted. This makes the frequency error detection circuit 33 simple, even though that lowers the accuracy of the frequency error Δf(k).

Furthermore, in the above-noted embodiment, the timing manager 43 changes the operation mode to one of the four modes 1 to 4. However the present invention is not limited to this. The operation mode may include other ones: a mode where one of the switching signals (the phase convergence loop switching signal EP, the frequency convergence loop switching signal EF, the frequency initial value loop switching signal EFR and the phase initial value loop switching signal EPR) is enabled, and a mode where all the switching signals are disenabled. In this case, it is desirable that it have more than one operation mode. The timings of enabling or disenabling those switching signals may be determined based on simulation and experiments.

Furthermore, in this case, the various operation modes may be set for a different type of optical disc 100 (based on the number of recording layers, the rates of transmission and reflection and the like): the optical disc device 1 identifies the type of optical disc 100, and then changes the operation mode.

Furthermore, in the above-noted embodiment, the phase synchronization section 8 includes these two types of loops: the frequency convergence loop where the multiplier 35 and the switch 36 are controlled to bring the frequency error Δf(k) close to zero based on the frequency error Δf(k); and a frequency initial value loop where the multiplier 38 and the switch 39 are controlled to bring the frequency error Δf(k) almost close to zero at one time based on the average frequency error Δfa(k). However the present invention is not limited to this. The phase synchronization section 8 may include only the frequency convergence loop or the frequency initial value loop.

Furthermore, in the above-noted embodiment, the phase synchronization section 8 includes the phase initial value loop having the moving average calculation circuit 40, the multiplier 41 and the switch 42. However the present invention is not limited to this. The phase synchronization section 8 may not be equipped with the phase initial value loop, omitting the moving average calculation circuit 40, the multiplier 41 and the switch 42.

Furthermore, in the above-noted embodiment, the moving average calculator 57 of the frequency error detection circuit 33 calculates the moving average of the frequency error Δf(k) to obtain the average frequency error Δfa(k). However the present invention is not limited to this. For example, the average frequency error Δfa(k) can be a value calculated statistically from a plurality of the frequency errors Δf(k): one calculated by multiplying the frequency errors Δf(k) by themselves, averaging the resultant values, and then calculating the square root. The same could be said for the moving average calculator 40 of the phase synchronization section 8.

Furthermore, in the above-noted embodiment, the interpolation filter coefficient calculation section 22A of the interpolator 22 produces, based on the coefficient control signal CC from the control section 2, the coefficients h(0) to h(n−1) using the function g(i). However the present invention is not limited to this. Instead of the function g(i), various functions appropriate for various frequency characteristics may be provided. In this case, the control section 2 may output, in response to a type of the optical disc 100, the coefficient control signal CC to change the function to produce the coefficients h(0) to h(n−1) with various frequency characteristics.

In this case, instead of the coefficient control signal CC, the control section 2 may supply the function g(i) or other functions directly to the interpolation filter coefficient calculation section 22A of the interpolator 22 in the format of formula and the like.

Furthermore, the control section 2 may supply, to the interpolation filter coefficient calculation section 22A, the coefficient control signal CC where the function g(i) is not applied. Alternatively, the interpolation filter coefficient calculation section 22A may not acquire the coefficient control signal CC from the control section 2, and produce the coefficients h(0) to h(n−1) to avoid emphasizing the high frequency range. This reduces the processing load of the interpolator 22, even though it lowers the accuracy of detection of the frequency error Δf(k) at the subsequent stages.

Furthermore, in the above-noted embodiment, the phase synchronization section 8 of the optical disc device 1 is applied to synchronize the phases of the reproduced RF signal SRF (FIG. 1) read from the optical disc 100. However, the present invention is not limited to this. A phase synchronization section of a magnetic disk device may be applied to synchronize the phases of a reproduced RF signal read from a magnetic disk. In this case, because the way of PR equalization, lengths of recording marks and other things are different between the optical discs and the magnetic disks, the following factors may be adjusted: the characteristics of wide-range emphasizing of the interpolator, patterns excluded by the pattern selectors, the characteristics of correcting by the PR equalizers and the like.

Furthermore, in the above-noted embodiment, the phase synchronization section 8 of the optical disc device 1 is applied to synchronize the phases of the reproduced RF signal SRF (FIG. 1) read from the optical disc 100. However the present invention is not limited to this. Other types of phase synchronization section may be applied.

Furthermore, in the above-noted embodiment, the phase synchronization section 8 (FIG. 3) is hardware. However the present invention is not limited to this. The parts other than the A/D converter 20 and the oscillator 21 (FIG. 3) can be software.

In this case, a Digital Signal Processor (DSP) may perform a predetermined phase synchronization program which is stored in a storage section (not shown) of the control section 2, or an external storage medium such as a flexible disk or "MEMORY STICK (Registered Trademark of Sony Corporation)". Alternatively, the phase synchronization program may be installed on the internal storage section from the external storage medium through a wired line such as Universal Serial Bus (USB) and "Ethernet (Registered Trademark)", or a wireless means such as IEEE (Institute of Electrical and Electronics Engineers) 802.11a/b/g and other types of wireless Local Area Network (LAN).

Furthermore, in the above-noted embodiment, the phase synchronization section 8 (equivalent to the synchronizing apparatus) includes: the zero crossing detection circuit 51 and the phase detector 54, which are equivalent to phase error detection means; the difference calculator 55, which is equivalent to frequency error detection means; and the multiplies 35 and 38, which are equivalent to frequency correction means. However the present invention is not limited to this. The synchronizing apparatus may include other types of circuits which are equivalent to the phase error detection means, the frequency error detection means and the frequency correction means.

The device, method and program according to an embodiment of the present invention may be applied to various PLL circuits.

It should be understood by those skilled in the art that various modifications, combinations, sub-combinations and alterations may occur depending on design requirements and other factors insofar as they are within the scope of the appended claims or the equivalents thereof.

What is claimed is:

1. A synchronizing apparatus for controlling, by a Phase Locked Loop (PLL) circuit, a sampling clock to be used to sample input data and synchronizing a phase of said sampling clock with a target phase that is desirable for sampling said input data, said synchronizing apparatus comprising:
   phase error detection means for detecting a phase error from sampling data and said sampling clock, said sampling data being sampled from said input data at timing of said sampling clock;
   frequency error detection means for detecting a frequency error based on a differential coefficient obtained as a result of detecting said phase error; and
   frequency correction means for correcting a frequency of said sampling clock such that the detected frequency error becomes close to zero by adding a frequency correction value to an integral term of a loop filter of said PLL circuit, said frequency correction value being calculated based on said frequency error;
   wherein to bring said frequency error close to zero, said frequency correction means repeatedly performs a process of multiplying the detection result of said frequency error by a predetermined coefficient to obtain said frequency correction value and then correcting the frequency of said sampling clock by adding said frequency correction value to the integral term of the loop filter of said PLL circuit; and
   wherein while said frequency correction means repeatedly performs a process of correcting the frequency of said sampling clock, a statistical process is performed on the detection result of said phase error to obtain a phase error estimate value, and a phase correction value is calculated by multiplying said phase error estimate value by a second predetermined coefficient, and then said PLL circuit is restarted by applying said phase correction value as an initial phase value of a Voltage Controlled Oscillator (VCO) or Numerical Control Oscillator (NCO) of said PLL circuit.

2. The synchronizing apparatus according to claim 1, wherein
   said frequency correction means generates, based on the result of detecting a plurality of frequency errors, a frequency error estimate value by a second statistical process, and calculates said frequency correction value by multiplying said frequency error estimate value by a third predetermined coefficient, and then brings said frequency error almost close to zero by applying said frequency correction value as an initial value of the integral term of the loop filter of said PLL circuit to perform frequency restart.

3. A synchronizing apparatus for controlling, by a Phase Locked Loop (PLL) circuit, a sampling clock to be used to sample input data and synchronizing a phase of said sampling clock with a target phase that is desirable for sampling said input data, said synchronizing apparatus comprising:

phase error detection means for detecting a phase error from sampling data and said sampling clock, said sampling data being sampled from said input data at timing of said sampling clock;

frequency error detection means for detecting a frequency error based on a differential coefficient obtained as a result of detecting said phase error; and frequency correction means for correcting a frequency of said sampling clock such that the detected frequency error becomes close to zero by adding a frequency correction value to an integral term of a loop filter of said PLL circuit, said frequency correction value being calculated based on said frequency error, wherein said phase error detection means detects said phase error using said sampling data corresponding to a part where a tentatively determined pattern matches a predetermined data pattern, said tentatively determined pattern being generated by comparing said sampling data with a predetermined level to tentatively determine a code and then arranging tentatively determined results in order of time.

4. The synchronizing apparatus according to claim 3, wherein when said tentatively determined results do not match said data pattern, said phase error detection means sets the immediately preceding phase error as a new phase error.

5. The synchronizing apparatus according to claim 1, wherein said frequency error detection means performs a second statistical process based on a plurality of frequency errors to detect jump timing of jumping into a reversed phase on the detection result of said phase error, and then excludes said frequency error corresponding to said jump timing.

6. The synchronizing apparatus according to claim 5, wherein said frequency error detection means detects said jump timing at a time when an absolute value of said frequency error passes a predetermined threshold, and then replaces said frequency error with a predetermined constant number.

7. The synchronizing apparatus according to claim 1, wherein said frequency error detection means calculates a difference between the detection result of said phase error and the immediately preceding timing detection result of said phase error to detect said frequency error.

8. A synchronizing apparatus for controlling, by a Phase Locked Loop (PLL) circuit, a sampling clock to be used to sample input data and synchronizing a phase of said sampling clock with a target phase that is desirable for sampling said input data, said synchronizing apparatus comprising:

phase error detection means for detecting a phase error from sampling data and said sampling clock, said sampling data being sampled from said input data at timing of said sampling clock;

frequency error detection means for detecting a frequency error based on a differential coefficient obtained as a result of detecting said phase error; and frequency correction means for correcting a frequency of said sampling clock such that the detected frequency error becomes close to zero by adding a frequency correction value to an integral term of a loop filter of said PLL circuit, said frequency correction value being calculated based on said frequency error, wherein said PLL circuit is an Interpolated Timing Recovery (ITR) circuit to perform interpolation on said sampling data by performing, by a predetermined interpolation filter, convolution on said sampling data and a predetermined tap coefficient and control, based on said phase error, phase of said sampling clock by a feedback loop; and said PLL circuit includes a tap coefficient generation means for generating said tap coefficient of said interpolation filter using a transformed value, said transformed value being generated by transforming an axis of a target frequency characteristic to be used to equalize said input data from a frequency axis to a time axis.

* * * * *